(12) United States Patent
Revur et al.

(10) Patent No.: US 9,495,409 B1
(45) Date of Patent: *Nov. 15, 2016

(54) TECHNIQUES FOR PERFORMING DATA VALIDATION

(71) Applicant: EMC Corporation, Hopkinton, MA (US)

(72) Inventors: Pradyumna Revur, Northborough, MA (US); Krishnakumar Subramanian, Shrewsbury, MA (US); Subbulakshmi Premkumar, Sudbury, MA (US); Sriram Krishnan, Shrewsbury, MA (US); Russell Laporte, Webster, MA (US); Yuanjie Wu, Shanghai (CN); James F. Britton, Framingham, MA (US)

(73) Assignee: EMC IP Holding Company LLC, Hopkinton, MA (US)

(*) Notice: Subject to any disclaimer, the term of this patent is extended or adjusted under 35 U.S.C. 154(b) by 0 days.

This patent is subject to a terminal disclaimer.

(21) Appl. No.: 14/940,450

(22) Filed: Nov. 13, 2015

Related U.S. Application Data

(63) Continuation of application No. 13/431,409, filed on Mar. 27, 2012, now Pat. No. 9,218,252.

(51) Int. Cl.
*G06F 7/00* (2006.01)
*G06F 17/00* (2006.01)
*G06F 17/30* (2006.01)
*G06F 11/14* (2006.01)
*H04L 29/08* (2006.01)

(52) U.S. Cl.
CPC ..... *G06F 17/30371* (2013.01); *G06F 11/1469* (2013.01); *G06F 17/30575* (2013.01); *H04L 67/1095* (2013.01); *G06F 2201/84* (2013.01)

(58) Field of Classification Search
CPC ........... G06F 11/2082; G06F 11/1662; G06F 11/2069; G06F 3/065; G06F 3/0689
USPC .................................................. 707/610–704
See application file for complete search history.

(56) References Cited

U.S. PATENT DOCUMENTS 6,671,705 B1 * 12/2003 Duprey ............... G06F 11/2058

* cited by examiner

*Primary Examiner* — Taelor Kim
(74) *Attorney, Agent, or Firm* — Muirhead and Saturnelli, LLC

(57) ABSTRACT

Described are techniques for processing a request from a client for performing an operation that is received by a business logic provider. First processing is performed by the business logic provider to process the request that includes communicating with other providers for information in connection with the request, performing validation processing using the information obtained from the other providers to determine whether one or more restrictions are violated, each of said one or more restrictions identifying a required state of one or more objects for performing an operation of the request, determining whether any restrictions are violated, and performing one or more actions responsive to determining that any restrictions are violated.

19 Claims, 23 Drawing Sheets

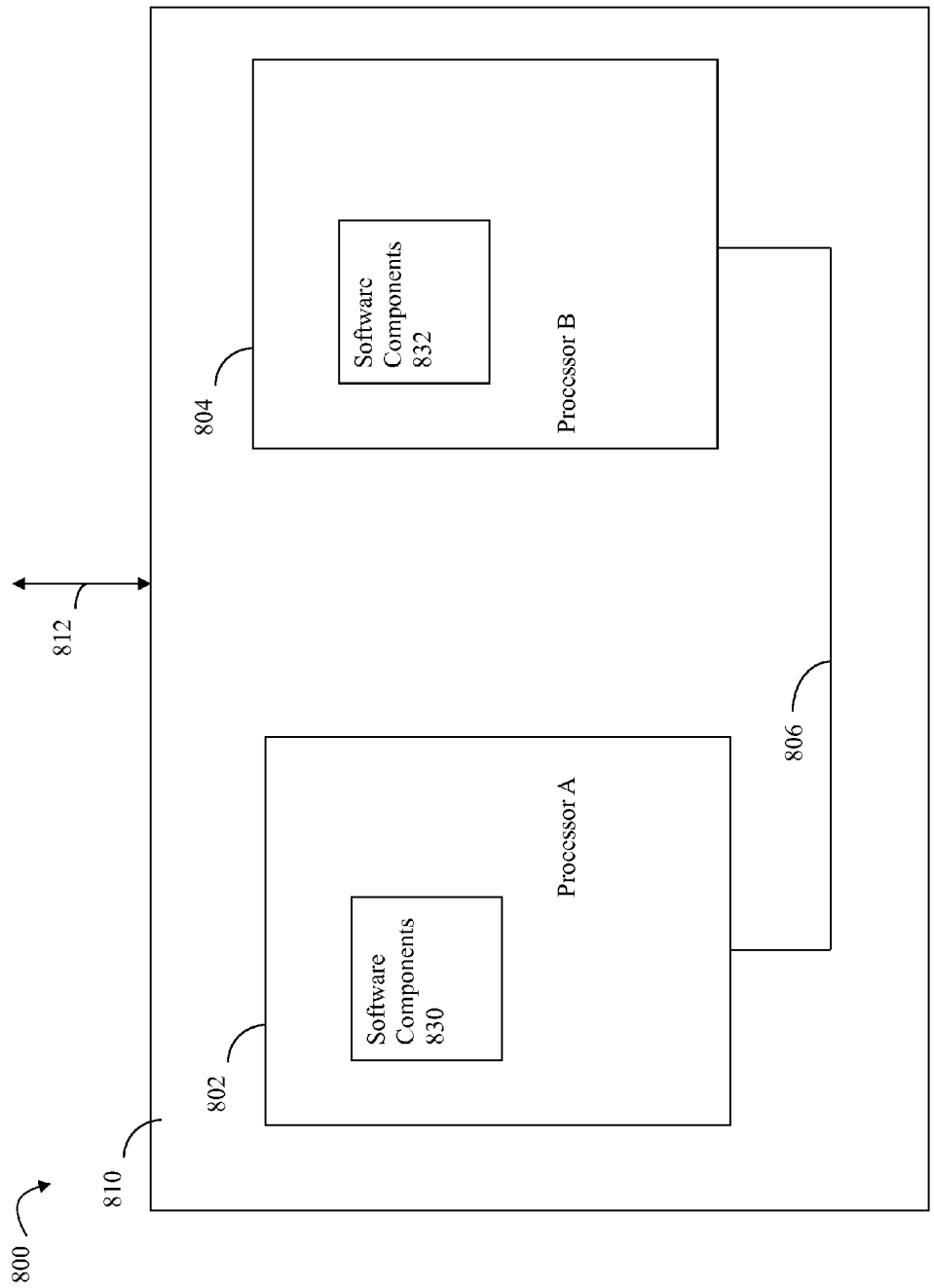

TECHNIQUES FOR PERFORMING DATA VALIDATION

RELATED APPLICATIONS

This application is a continuation of U.S. application Ser. No. 13/431,409 filed Mar. 27, 2012 (pending), which is hereby incorporated by reference.

BACKGROUND

Technical Field

This application relates to techniques used in connection with processing data and performing data validation.

Description of Related Art

Computer systems may include different resources used by one or more host processors. Resources and host processors in a computer system may be interconnected by one or more communication connections. These resources may include, for example, data storage devices such as those included in the data storage systems manufactured by EMC Corporation. These data storage systems may be coupled to one or more servers or host processors and provide storage services to each host processor. Multiple data storage systems from one or more different vendors may be connected and may provide common data storage for one or more host processors in a computer system.

A host processor may perform a variety of data processing tasks and operations using the data storage system. For example, a host processor may perform basic system I/O operations in connection with data requests, such as data read and write operations.

Host processor systems may store and retrieve data using a storage device containing a plurality of host interface units, disk drives, and disk interface units. The host systems access the storage device through a plurality of channels provided therewith. Host systems provide data and access control information through the channels to the storage device and the storage device provides data to the host systems also through the channels. The host systems do not address the disk drives of the storage device directly, but rather, access what appears to the host systems as a plurality of logical disk units. The logical disk units may or may not correspond to the actual disk drives. Allowing multiple host systems to access the single storage device unit allows the host systems to share data in the device. In order to facilitate sharing of the data on the device, additional software on the data storage systems may also be used.

In connection with data storage systems, or more generally any type of system, data may be provided to a user or client in response to a client request. The client request may be a request to obtain information or perform an operation. The client may issue requests to multiple providers each having its own published API (application programming interface) which the client uses when issuing requests. The client may therefore have to utilize a variety of different and possibly disparate interfaces for desired requests.

SUMMARY OF THE INVENTION

In accordance with one aspect of the invention is a method for processing a request comprising: receiving, at a business logic provider, a request from a client to perform an operation; performing first processing by the business logic provider to process the request, the first processing including: communicating with one or more other providers for information in connection with the request; performing validation processing using the information obtained from the one or more other providers to determine whether one or more restrictions are violated, each of said one or more restrictions identifying a required state of one or more objects for performing an operation of the request; determining whether any of said one or more restrictions are violated; and performing one or more actions responsive to determining that any of said one or more restrictions are violated. The business logic provider may communicate with any of a snapshot provider providing services in connection with a first snapshot of a first storage device and a storage device provider providing services in connection with the first storage device having the first snapshot. The first storage device may have a first snapshot taken at a first point in time and the request may be received at a second point in time subsequent to said first point in time and the request may be to restore the first storage device to its first snapshot. A first of said restrictions may specify that a first storage device is not restored to one of its snapshots if said first storage device has an active mirroring relationship. The first processing may further comprise communicating with said storage device provider to obtain a first set of one or more properties for said first storage device, a first property in said first set indicating whether said first storage device has a mirroring relationship that is active or inactive, wherein said first storage device is configured to have said mirroring relationship with a primary copy of data of the storage device that is mirrored in a second copy. Validation processing may include determining whether said first property indicates whether said mirroring relationship for said first storage device is active, whereby when said mirroring relationship for said first storage device is active, synchronization processing is performed to keep said second copy synchronized with said primary copy and when said mirroring relationship is inactive, synchronization processing is not performed to keep said second copy synchronized with said primary copy. If it is determined that said mirroring relationship for said first storage device is active, it may be determined that there has been a restriction violation and not to restore the first storage device to its first snapshot. If it is determined that said mirroring relationship for the first storage device is inactive, processing may include communicating with said snapshot provider to restore the first storage device to the first snapshot. If it is determined that said mirroring relationship for said first storage device is active, it may be determined that there has been a restriction violation and other processing may be performed that includes fracturing said mirroring relationship for the first storage device thereby setting said mirroring relationship to inactive, restoring the first storage device to its first snapshot, and unfracturing said mirroring relationship for the first storage device thereby setting said mirroring relationship to active. One or more consistency groups may be defined where each consistency group includes a plurality of storage devices. A snapshot of said each consistency group may be performed to obtain a consistent snapshot of said plurality of LUNs in said each consistency group. The request may be to destroy the first storage device thereby performing processing to remove a definition of said first storage device as a storage entity in the data storage system and requesting deallocation of storage associated with the first storage device. A first of said restrictions may specify that a storage device cannot be destroyed if the storage device is included in a consistency group and the method may further comprise communicating with said snapshot provider to determine whether the first storage device is included as a member of any of said one or more consistency groups. If the first storage device is included as a member of any of said one or more consistency groups, it may be determined not to perform the operation to destroy the first storage device, and if the first storage device is not included as a member of any of said one or more consistency groups, processing may include communicating with the storage device provider to destroy the first storage device. The business logic provider may receive a consistency group object for each of said one or more consistency groups and the consistency group object may include a property identifying a set of one or more storage devices included in said each consistency group. Each storage device in the set may be identified by a storage device identifier that is used as a key in a table of storage device information used by said storage device provider. The business logic provider may examine said set of one or more consistency groups for a match to said first storage device having a first device identifier that is a key in said table of storage device information used by said storage device provider. The first storage device may have a first snapshot at a first point in time and said first storage device may be a source of an active migration operation to migrate the first storage device to a second storage device. The request may be request to restore the first storage device to the first snapshot. The business logic provider may communicate with said storage device provider in connection with determining whether said first storage device is a source of an active migration operation, and a first of said restrictions may specify that a restoration operation cannot be performed to restore a storage device that is a source of an active migration. If it is determined that said first storage device is a source of an active migration, it may be determined not to perform the request restore the first storage device, and if it is determined that said first storage device is not a source of an active migration, processing may be performed including communicating with said snapshot provider to restore the first storage device to the first snapshot of the first storage device. The first storage device may have a first snapshot at a first point in time and the first snapshot may have a first expiration date indicating when the first snapshot is deemed expired. The request may be a request to restore the first storage device to the first snapshot. The business logic provider may communicate with the snapshot provider to determine whether the first snapshot has expired, and the method may include determining whether the first snapshot has expired, if it is determined that the first snapshot has expired, performing second processing including: issuing a warning to the client regarding expiration of the first snapshot; obtaining a response as to whether to proceed with the request to restore the first storage device to the first snapshot; and communicating with said snapshot provider to restore the first storage device to the first snapshot if said response indicates to proceed with the request. If it is determined that the first snapshot has not expired, processing may include communicating with said snapshot provider to restore the first storage device to the first snapshot. The first storage device may be a source device of an active migration operation to migrate the first storage device to a second storage device. The request may be a request to create a first snapshot of the first storage device, and the business logic provider may communicate with the storage device provider to determine whether the first storage device is currently the source of an active migration. One of the restrictions may specify that a snapshot should not be created for a storage device that is a source of an active migration. The method may include determining whether the first storage device is a source device of an active migration. If it is determined that the first storage device is not a source device of an active migration, processing may include communicating with said snapshot provider to create the first snapshot of the first storage device in accordance with the request.

In accordance with another aspect of the invention is a computer readable medium comprising code stored thereon for processing a request, the computer readable medium comprising code stored thereon for: receiving, at a business logic provider, a request from a client to perform an operation; performing first processing by the business logic provider to process the request, the first processing including: communicating with one or more other providers for information in connection with the request; performing validation processing using the information obtained from the one or more other providers to determine whether one or more restrictions are violated, each of said one or more restrictions identifying a required state of one or more objects for performing an operation of the request; determining whether any of said one or more restrictions are violated; and performing one or more actions responsive to determining that any of said one or more restrictions are violated. The business logic provider may communicate with any of a snapshot provider providing services in connection with a first snapshot of a first storage device and a storage device provider providing services in connection with the first storage device having the first snapshot.

BRIEF DESCRIPTION OF THE DRAWINGS

Features and advantages of the present invention will become more apparent from the following detailed description of exemplary embodiments thereof taken in conjunction with the accompanying drawings in which:

FIG. 2A is an example illustrating a data storage system including multiple service processors in an embodiment in accordance with techniques herein;

DETAILED DESCRIPTION OF EMBODIMENT(S)

Figure 1:
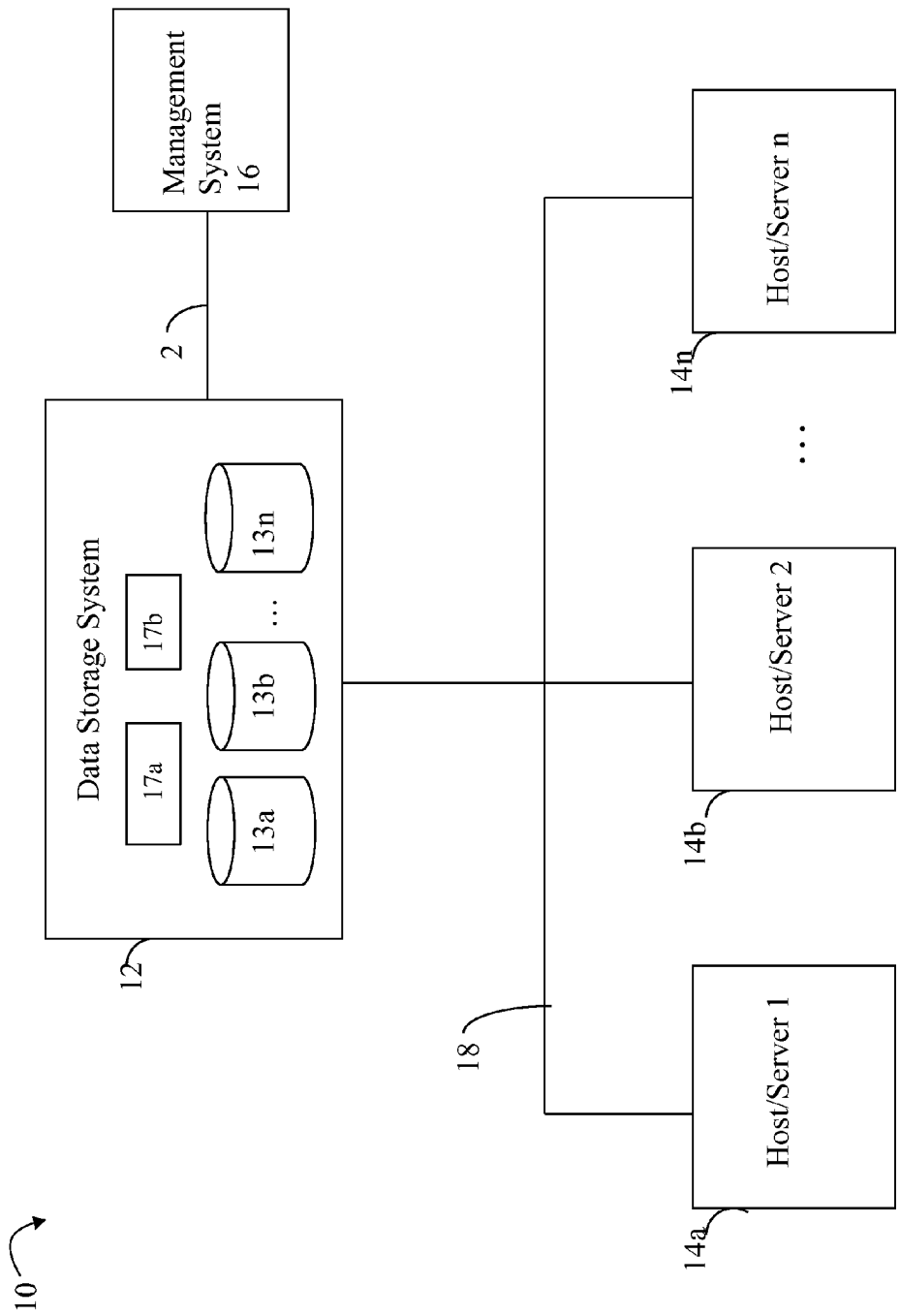
FIG. 1 is an example of an embodiments of a system that may utilize the techniques described herein.

Referring to FIG. 1, shown is an example of an embodiment of a system that may be used in connection with performing the techniques described herein. The system 10 includes one or more data storage systems 12 connected to server or host systems 14a-14n through communication medium 18. The system 10 also includes a management system 16 connected to one or more data storage systems 12 through communication medium 2. In this embodiment of the system 10, the management system 16, and the N servers or hosts 14a-14n may access the data storage systems 12, for example, in performing input/output (I/O) operations, data requests, and other operations. The communication medium 18 may be any one or more of a variety of networks or other type of communication connections as known to those skilled in the art. Each of the communication mediums 18 and 2 may be a network connection, bus, and/or other type of data link, such as a hardwire or other connections known in the art. For example, the communication medium 18 may be the Internet, an intranet, network or other wireless or other hardwired connection(s) by which the host systems 14a-14n may access and communicate with the data storage systems 12, and may also communicate with other components (not shown) that may be included in the system 10. In one embodiment, the communication medium 2 may be a LAN connection and the communication medium 18 may be an iSCSI or Fibre Channel connection.

Each of the host systems 14a-14n and the data storage systems 12 included in the system 10 may be connected to the communication medium 18 by any one of a variety of connections as may be provided and supported in accordance with the type of communication medium 18. Similarly, the management system 16 may be connected to the communication medium 2 by any one of variety of connections in accordance with the type of communication medium 2. The processors included in the host computer systems 14a-14n and management system 16 may be any one of a variety of proprietary or commercially available single or multi-processor system, such as an Intel-based processor, or other type of commercially available processor able to support traffic in accordance with each particular embodiment and application.

It should be noted that the particular examples of the hardware and software that may be included in the data storage systems 12 are described herein in more detail, and may vary with each particular embodiment. Each of the host computers 14a-14n, the management system 16 and data storage systems may all be located at the same physical site, or, alternatively, may also be located in different physical locations. In connection with communication mediums 18 and 2, a variety of different communication protocols may be used such as SCSI, Fibre Channel, iSCSI, and the like. Some or all of the connections by which the hosts, management system, and data storage system may be connected to their respective communication medium may pass through other communication devices, such as switching equipment that may exist such as a phone line, a repeater, a multiplexer or even a satellite. In one embodiment, the hosts may communicate with the data storage systems over an iSCSI or a Fibre Channel connection and the management system may communicate with the data storage systems over a separate network connection using TCP/IP. It should be noted that although FIG. 1 illustrates communications between the hosts and data storage systems being over a first connection, and communications between the management system and the data storage systems being over a second different connection, an embodiment may also use the same connection. The particular type and number of connections may vary in accordance with particulars of each embodiment.

Each of the host computer systems may perform different types of data operations in accordance with different types of tasks. In the embodiment of FIG. 1, any one of the host computers 14a-14n may issue a data request to the data storage systems 12 to perform a data operation. For example, an application executing on one of the host computers 14a-14n may perform a read or write operation resulting in one or more data requests to the data storage systems 12.

The management system 16 may be used in connection with management of the data storage systems 12. The management system 16 may include hardware and/or software components. The management system 16 may include one or more computer processors connected to one or more I/O devices such as, for example, a display or other output device, and an input device such as, for example, a keyboard, mouse, and the like. A data storage system manager may, for example, view information about a current storage volume configuration on a display device of the management system 16, provision data storage system resources, and the like.

In one embodiment, the data storage systems 12 may include one or more data storage systems such as one or more of the data storage systems, such as data storage arrays, offered by EMC Corporation of Hopkinton, Mass. Each of the data storage systems may include one or more data storage devices 13a-13n, such as disks. One or more data storage systems may be manufactured by one or more different vendors. Each of the data storage systems included in 12 may be inter-connected (not shown). Additionally, the data storage systems may also be connected to the host systems through any one or more communication connections that may vary with each particular embodiment and device in accordance with the different protocols used in a particular embodiment. The type of communication connection used may vary with certain system parameters and requirements, such as those related to bandwidth and throughput required in accordance with a rate of I/O requests as may be issued by the host computer systems, for example, to the data storage systems 12. It should be noted that each of the data storage systems may operate stand-alone, or may also be included as part of a storage area network (SAN) that includes, for example, other components such as other data storage systems. Each of the data storage systems may include a plurality of disk devices or volumes 13a-13n. The particular data storage systems and examples as described herein for purposes of illustration should not be construed as a limitation. Other types of commercially available data storage systems, as well as processors and hardware controlling access to these particular devices, may also be included in an embodiment.

In such an embodiment in which element 12 of FIG. 1 is implemented using one or more data storage systems, each of the data storage systems and management system 16 may include code thereon for performing the techniques as described herein.

Servers or host systems, such as 14a-14n, provide data and access control information through channels to the storage systems, and the storage systems may also provide data to the host systems also through the channels. The host systems may not address the disk drives of the storage systems directly, but rather access to data may be provided to one or more host systems from what the host systems view as a plurality of logical devices or logical volumes (LVs). The LVs may or may not correspond to the actual disk drives. For example, one or more LVs may reside on a single physical disk drive. Data in a single storage system may be accessed by multiple hosts allowing the hosts to share the data residing therein. An LV or LUN (logical unit number) may be used to refer to the foregoing logically defined devices or volumes.

For purposes of illustration, the techniques herein will be described with respect to a single unitary data storage system, such as single data storage array, including two service processors or compute processing units. Techniques herein may be more generally use in connection with any one or more data storage system each including a different number of service processors than as illustrated herein. The data storage system 12 may be a data storage array, such as a CLARiiON® data storage array by EMC Corporation of Hopkinton, Mass., including a plurality of data storage devices 13a-13n and two service or storage processors 17a, 17b. The service processors 17a, 17b may be computer processing units included in the data storage system for processing requests and commands. In connection with performing techniques herein, an embodiment of the data storage system may include multiple service processors including more than two service processors as described. The CLARiiON® data storage system mentioned above may include two service processors 17a, 17b for performing processing in connection with servicing requests. Additionally, the two service processors 17a, 17b may be used in connection with failover processing when communicating with the management system 16. Client software on the management system 16 may be used in connection with performing data storage system management by issuing commands to the data storage system 12 and/or receiving responses from the data storage system 12 over connection 2. In one embodiment, the management system 16 may be a laptop or desktop computer system.

The particular data storage system as described in this embodiment, or a particular device thereof, such as a disk, should not be construed as a limitation. Other types of commercially available data storage systems, as well as processors and hardware controlling access to these particular devices, may also be included in an embodiment.

Figure 2:
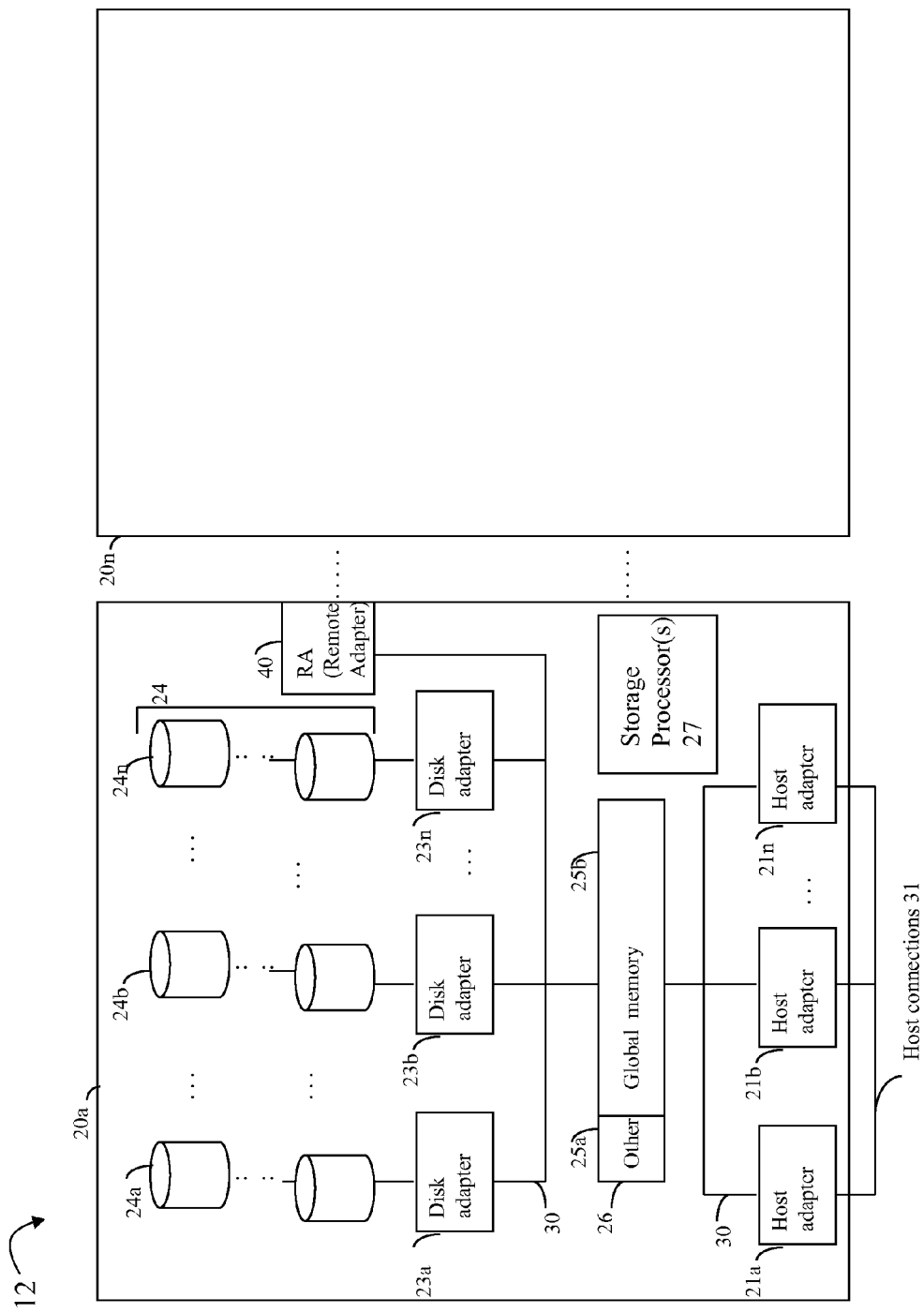
FIG. 2 is an example illustrating details of a data storage system in accordance with techniques herein.

Referring to FIG. 2, shown is an example of an embodiment of the data storage system 12 that may be included in the system 10 of FIG. 1. Included in the data storage system 12 of FIG. 2 are one or more data storage systems 20a-20n as may be manufactured by one or more different vendors. Each of the data storage systems 20a-20n may be a data storage array inter-connected (not shown) to other data storage array(s). Additionally, as noted above, the data storage systems may also be connected to the host systems through any one or more communication connections 31. In this example as described in more detail in following paragraphs, reference is made to the more detailed view of element 20a. It should be noted that a similar more detailed description may also apply to any one or more of the other elements, such as 20n, but have been omitted for simplicity of explanation.

Each of the data storage systems, such as 20a, may include a plurality of storage devices such as disk devices or volumes included in an arrangement 24 consisting of n rows of disks or more generally, data storage devices, 24a-24n. In this arrangement, each row of disks may be connected to a disk adapter ("DA") or director responsible for the backend management of operations to and from a portion of the disks 24. In the system 20a, a single DA, such as 23a, may be responsible for the management of a row of disks, such as row 24a. In a data storage system such as by EMC Corporation, a backend DA may also be referred to as a disk controller. The DA may performed operations such as reading data from, and writing data to, the physical devices which are serviced by the DA.

The system 20a may also include one or more storage processors 27. Each of the storage processors 27 may be CPU and an embodiment may include any number of such processors. For example, the CLARiiON® data storage system by EMC Corporation includes two storage processors. The system 20a may also include one or more host adapters ("HAs") or directors 21a-21n. Each of the HAs may be used to manage communications and data operations between one or more host systems and the global memory. In an embodiment, the HA may be a Fibre Channel Adapter (FA) or other adapter which facilitates host communication. The HA communicates with a component of the host such as a host bus adapter (HBA). Generally, directors may also be characterized as the different adapters, such as HAs (including FAs), DAs RAs and the like, as described herein. Components of the data storage system, such as an HA, which may communicate with a host may also be referred to as front end components. Within the data storage system, components, which may be characterized as backend components, communicate with a front end component. An example of a backend component is a DA. In connection with data storage systems such as by EMC Corporation, various types of directors or adapters may be implemented as a processor, or, more generally, a component that includes the processor. Examples of directors are disk adapters (DAs), host adapters (HAs), and the like.

One or more internal logical communication paths may exist between the DAs, the RAs, the HAs, and the memory 26. An embodiment, for example, may use one or more internal busses and/or communication modules. For example, the global memory portion 25b may be used to facilitate data transfers and other communications between the DAs, HAs and RAs in a data storage system. In one embodiment, the DAs 23a-23n may perform data operations using a cache that may be included in the global memory 25b, for example, in communications with other disk adapters or directors, and other components of the system 20a. The other portion 25a is that portion of memory that may be used in connection with other designations that may vary in accordance with each embodiment.

Also shown in the storage system 20a is an RA or remote adapter 40. The RA may be hardware including a processor used to facilitate communication between data storage systems, such as between two of the same or different types of data storage systems.

Referring to FIG. 2A, shown is a block diagram of components that may be included in a data storage system 810. In the example 800, there are two service processors 802, 804 (also referred to as service processors A and B) although a data storage system and techniques herein may be used in an embodiment in which the data storage system includes more than two service processors as mentioned above. Service processor 802 includes software components or modules 830 executing thereon. Service processor 804 includes software components or modules 832 executing thereon. Service processor 802 and 804 may communicate using 806 which is described in more detail below. Element 812 may represent a single logical communication connection used for data storage system management transmissions between the data storage system 810 and one or more external clients. The software components or modules 830 and 832 may be software modules included in data storage system management software residing and executing on the data storage system 810 including software used in connection with communicating with external clients over network connection 812.

The two service processors 802, 804 may control the operation of the data storage system. The processors may be configured to process requests as may be received from the hosts, other data storage systems, management system, and other components connected thereto. Each of the processors 802, 804 may process received requests and operate independently and concurrently with respect to the other processor. In the example 800, each processor is illustrated as having one or more software modules (e.g., web server, drivers, other modules etc.) executing thereon. An embodiment may have a same set of one or more software modules executing on each processor so that either of the processors may service a received request. The example 800 may illustrate the state of the data storage system with software modules that are loaded as a result of booting the data storage system. In the example 800, the processors 802 and 804 have successfully completed the boot process leaving both 802 and 804 in what may be characterized as a healthy state with respect to data storage system management functionality. A service processor may be characterized as being in the healthy state if the service processor has the ability to service normal data storage system management messaging traffic over a communication connection, such as a network connection, used for data storage management. In other words, a processor may be characterized as healthy if it is determined that the processor is able to perform necessary processing and communications in connection with handling typical data storage system management transmissions over a connection used for normal data storage management messaging traffic. A processor may otherwise be characterized as being in an unhealthy state if any deficiency is determined with respect to the foregoing, such as a hardware and/or software problem, so that the processor is unable to be used in connection with handling data storage system management transmissions. Once booted, a processor may transition between the states of healthy and unhealthy in accordance with problems that may occur and/or be corrected over time.

With respect to data storage management requests, operations, and the like, as may be received from a client, such as the management system 16 of FIG. 1 in connection with the techniques herein, the client may interact with a designated one of the two processors 802, 804 over the communication connection 812. The designated one of the processors may be characterized as the master with the other processor designated as the slave. In connection with one embodiment in accordance with techniques herein, the data storage system may operate in accordance with a master-slave or active-passive model when communicating with the management system 16. In accordance with the master-slave model, only one of the processors 802, 804 and only one instance of the software modules executing thereon, may be designated as a "master" with the other processor and associated software modules thereon designated as the "slave". It should be noted that as used herein, the terms "active" and "master" may be used interchangeably to refer to the designated active or master processor in the master-slave or active-passive model. Similarly, the terms "slave" or "passive" may be used interchangeably to refer to the one or more processors other than the active or master processor in accordance with the master-slave or active-passive model.

In the example 800, instances of the software components 830, 832 executing, respectively, on processors 802, 804 may communicate over connection 806. The connection 806 may be a bus or other communication connection to facilitate inter-processor communication between the drivers. The connection 806 may be characterized as internal to the data storage system or local with respect to residing on the data storage system and used for communicating between components on the data storage system. The connection 806 may also be referred to as the common management interconnection (CMI) and may be characterized as part of an internal network over which inter-processor communications may occur. Thus, one of the service processors may use connection 806 to communication with the other service processor. As will be described in more detail in following paragraphs, each service processor may include code which facilitates communication with the other service processor using the connection 806 for inter-service processor communication. In particular, code of a first service processor may use connection 806 to obtain information collected from another service processor for use in connection with the first service processor providing a consolidated view of the data storage system such as when providing such information in response to a data storage system management request from the management system 16.

The processors 802, 804 may also communicate over another connection 812. The connection 812 may represent a TCP/IP or other network connection over which instances of the software components 830, 832 on processors 802, 804 (respectively) may communicate with other externally networked components. Connection 812 may correspond to a single logical connection used, for example, to communicate with a client such as the management system 16 running a web browser displaying a GUI (graphical user interface). The connection 812 may be characterized as a single communication connection between the data storage system and the management system over which the user on the management system 16 may interact with the data storage system in performing data storage system management tasks. The processors 802, 804 may send and/or receive transmissions over connection 812 from the management system 16 of FIG. 1. In one embodiment, the connection 812 may be part of a dedicated LAN connection for management operations. Host I/O requests may be received at the data storage system on different incoming ports such as, for example, Fibre channel or iSCSI ports not illustrated.

Only one of the processors 802, 804 is designated as active or the master at any time. Thus, at any point in time, at most one of the SPs 802, 804 communicates with a client in connection with handling data storage system management transmissions over the single connection 812. In the event that an active master processor transitions from a healthy to an unhealthy state, the passive slave processor assumes the role of master if it is in a healthy state. In connection with techniques herein, when failover processing results in a processor assuming the role of master, the software components thereon may also be designated as the instance of the software modules which are active and communicate with the client. As described herein, a processor may be characterized as having an unhealthy state if the processor and/or software components executing thereon are not able to communicate with and/or process requests from an external client, such as the management system 16, over a network. Detection of the state of a processor and/or software components executing thereon as healthy or unhealthy may be performed using a variety of different techniques such as, for example, by the processor itself and/or its peer processor. Such techniques may include, for example, periodically having each processor test communications with the other processor over connections 806, determining a status regarding the software modules on a service processor and its ability to communicate over the external communication connection used for data storage system management transmissions, receiving a notification regarding status of a peer processor, and the like.

The connection 812 may have a single network address, such as an IP address, over which the active processor and code executing thereon may communicate with the management system 16 in connection with performing the techniques herein. The software components 830, 832 may represent software components or modules as described herein in more detail on each of the processors. It should be noted that the data storage system 810 of the example 800 includes other components, such as storage devices, which are omitted from the example 800 for simplicity in illustrating the dual processors 802, 804.

In connection with techniques herein, the management system 16 may issue a request to the data storage system such as illustrated in FIG. 2A. The request may be to provide a logical system configuration view regarding components of the data storage system, the state of such components, and the like. In connection with providing such a view, information may be gathered from each of the service processors A and B of FIG. 2A. Each service processor may be configured to view a same set of components of the data storage system. For example, each service processor may view all storage devices and groups of storage devices of the storage system. Additionally, each service processor may also provide information regarding components viewed/visible locally or only by that service processor. For example, each service processor may provide a view of information regarding components used only by the service processor such as fans and power supplies used only by each service processor. To provide a complete, consistent and consolidated view of the data storage system configuration from both service processors, processing may be performed by a service processor to aggregate information locally by the service processor along with information collected from the other service processor. For example, service processor A may be the master and perform such processing by collecting a local view of configuration information as viewed by service processor A and also requesting and obtaining configuration information as viewed by service processor B. Service processor A may perform processing to combine both its local view and the view in connection with the configuration information collected from service processor B. To perform such collection, the service processors may communicate using connection 806 described above and then perform consolidation processing to combine the collected data into a single consolidated view of the data storage system configuration.

The techniques herein may also be used in an embodiment as described above based on the active/passive or master/slave SP model. However, an embodiment in accordance with techniques herein may utilize other SP models in connection with providing the consolidated view. For example, as a variation to the foregoing, an embodiment in accordance with techniques herein may implement an active-active model in connection with providing a consolidated view of data storage configuration information. In the active-active model with the multiple SPs of a data storage system, a request from a client for the data storage configuration information may be provided by any of the SPs at any time thereby having any SP provide the consolidated view in accordance with techniques herein at any time depending on which SP services a client's request. As a further variation in an embodiment which has more than 2 SPs, an embodiment may designate a portion of the SPs as active in connection with servicing a client request at any time, where the portion may be less than all of the SPs but more than a single SP. In such embodiments in a data storage system having multiple SPs, each SP of the data storage system may collect and consolidate configuration from every other SP and perform techniques described herein to provide a consolidated view of the data storage system across the multiple SPs.

What will be described in following paragraphs are techniques that may be used in connection with software components to gather data from multiple nodes in accordance with a first data model, and then perform processing to map or translate the collected data in the first data model to a second different data model. The second data model may place the data in accordance with a format and structure consumable or usable by a client such as a user interface that displays the resulting data of the second data model to a user. The first data model may, for example, utilize data in a form as reported by drivers or other lower level components. The second data model may also be referred to as a client data model. In connection with techniques herein, the second data model may be a virtual table or view constructed dynamically (or "on the fly") in response to a client request. In processing or mapping data from the first data model to the second data model, an intermediate layer and also intermediate object model may be utilized. The objects of the first data model and intermediate object model may be object-based models using database tables. The objects of the client data model may be included in virtual tables or views such as constructed using database queries.

As mentioned above, the techniques herein may be used with an object-based model using database tables and virtual tables. In particular both the first and second data model (as well as the intermediate object model) may be different object-based models using different set of tables. In such an embodiment using an object-based model, a row in a table (e.g. where the table may be a virtual or database table) may correspond to an object instance and each column in the table may correspond to an attribute or property of the object. The object may correspond to, and represent the state of, a physical or logical entity in the data storage system. For example, depending on the model, an object may represent a physical component such as a fan, power supply, port, logical storage device, or physical storage device. The physical and/or logical component may be characterized by state information represented as properties or attributes of an object. For example, an object corresponding to a physical storage device may have attributes representing the total available storage capacity, an amount of unused or free storage capacity, physical device characteristics, and the like. An object may also represent a logical entity such as a RAID group, LUN or LV, storage group of one or more LUNs, and the like. A logical entity such as a RAID group may be represented by an object having attributes such as indicating a RAID level of the RAID group (e.g., RAID-0, 1, 5, or 6), a number of data and/or parity drives, and the like.

Figure 3:
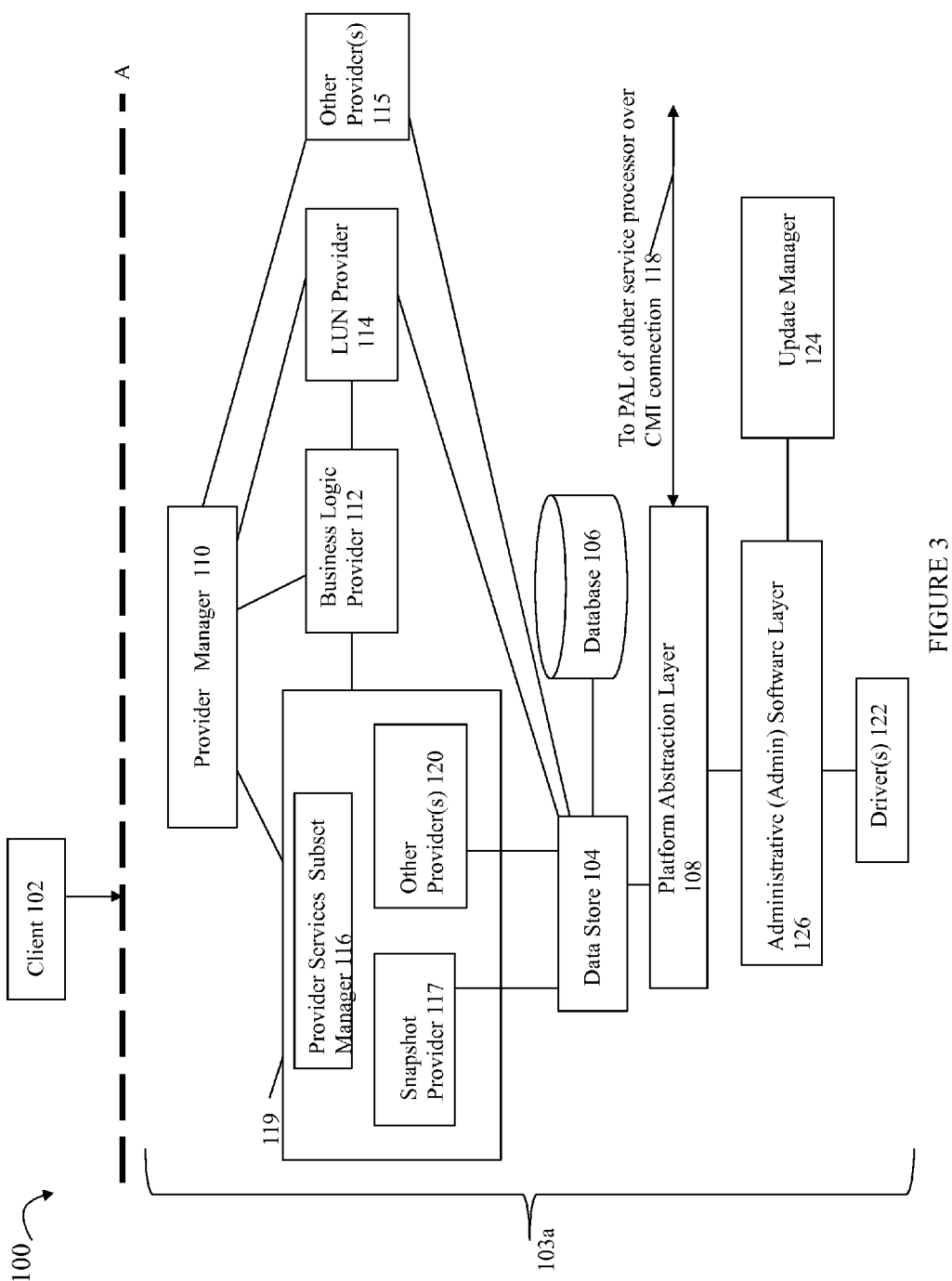
FIG. 3 is an example of software components that may be included in an embodiment in accordance with techniques herein.

Referring to FIG. 3, shown is an example of software components that may be included in an embodiment in accordance with techniques herein. The example 100 includes components 103*a* of the data storage system and an external client 102. As described in more detail below, the components 103*a* included on the data storage system may be used in connection with mapping data of first data model to a second data model. The dashed line denoted as A may represent a partitioning of components 103*a* included in the data storage system (e.g., those below the dashed line A) and those which are external to the data storage system (e.g., those above the dashed line A). The example 100 includes a remote or external client 102 and components below dashed line A representing those components 103a of one of the service processors, such as SPA, of the data storage system. It should be noted that although an instance of the components of 103a are illustrated with respect to only a single service processor A, each other service processor of the data storage system, such as service processor B, may also include an instance of the components of 103a. Element 103a includes the following software components: provider manager 110, services subset 119, business logic provider 119, LUN provider 114, one or more other providers 115, data store 104, database 106, platform abstraction layer (PAL) 108, admin (administrative) software layer 126, and driver(s) 130.

Element 119 may represent a subset of providers that may be used in connection with providing information for use in connection with responding to a client request for information. In this example, element 119 may include a provider services subset manager 116, a snapshot provider 117 and one or more other providers 120 included in the subset partitioning of 119. Element 119 may represent a designated portion of such provider services as may be functionally included, for example, in a DLL (dynamic link library) or other functional framework. In one embodiment element 119 may represent providers of newly developed code and data models in contrast to, for example, older legacy code modules and data models as may be used by the providers 114 and 115.

The snapshot provider 117 may provide information in connection with snapshots of LUNs. As known in the art, a snapshot may be characterized as a point in time logical image of data. In connection with LUNs, software of a data storage system may provide one or more data replication services or facilities whereby a snapshot is one such facility. The SnapView™ application is an application provided by EMC Corporation which may be used to create point in time snapshot of production data for nondisruptive backup. A snapshot may be made with respect to a source LUN thereby providing a point in time image of the source LUN. A snapshot may appear like a normal LUN and may be used for backup, testing, and the like. Snapshots may rely, for example, on copy on first write (COFW) and other techniques to track source LUN changes from the time when a snapshot was created. Any writes to the source LUN may result in processing by snapshot software to copy the original data prior to changes into another area of storage. With respect to COFW techniques, the COFW occurs only once for each data block modified on the source LUN. Since only changed data blocks of the source LUN are retained rather than make a complete copy of the source LUN, the storage capacity required to implement snapshots may be considerably less than that of the source LUN. A snapshot of a LUN is a virtual point in time copy and requires access to the unchanged data in the source LUN. Therefore failures affecting the source LUN also affect the snapshot of the LUN. Snapshots of a LUN may be contrasted, for example, with clones or bit-for-bit replica data copies of a source LUN. Information regarding clones in connection with servicing client requests may be provided by another provider, such as a clone provider included as one of the other providers 115 or 120. The snapshot provider 117 may receive as an input an identifier uniquely identifying a particular snapshot. The unique snapshot identifier may identify an object instance including properties of the particular snapshot. In response, the snapshot provider 117 may provide/return all properties of the particular snapshot identified by the received unique snapshot identifier.

The LUN provider 114 may provide information about requested LUNs. For example, the LUN provider 114 may receive as an input an identifier uniquely identifying a particular LUN. The unique LUN identifier may identify an object instance including properties of the particular LUN. In response, the LUN provider 114 may provide/return all properties of the particular LUN identified by the received unique LUN identifier. More generally, the LUN provider 114 may also be referred to as a storage device provider.

As described in more detail in following paragraphs, the business logic provider 112 may perform processing in accordance defined business logic. With reference to data storage management, an operation or task of the business logic provider may include retrieving different sets of information of a current data storage configuration for display and presentation to a user (e.g., client 102) via a data storage management GUI (graphical user interface). The user may issue a request for particular data storage management information through the GUI, for example, by selecting a menu item or other interface element. In response, code of the GUI may issue a request to the data storage system modules 103a to perform an operation and obtain the requested information. In connection with obtaining the desired information in accordance with the client request, the business logic provider 112 may facilitate and coordinate communications with one or more different providers to obtain the desired information. A client, such as external or remote client 102, may request to receive a consolidated logical view of components of the data storage system and may communicate with one of the storage processors A, B currently designated as the master. For example, assume processor A is the master processor. The client request may be received by the provider manager 110 which then forwards the client request to the appropriate provider. For example, the provider manager 110 may receive a request from the client 102 to obtain information regarding a particular snapshot. The client request may include a unique snapshot identifier as described elsewhere herein. In particular, the client may request to obtain LUN information corresponding to the source LUN of the snapshot having the unique snapshot identifier. Thus, to be returned to the client may be a LUN object in terms of the client data model including all properties or attributes of the source LUN of the snapshot (having the snapshot identifier included in the client requested). The provider manager 110 may forward this particular request for information on the requested snapshot having the unique snapshot identifier to the business logic provider 112. The business logic provider 112 may then communicate with one or more other providers to obtain the requested information for the source LUN object for the unique snapshot identifier of the client request. As a first step, the business logic provider may request a list of properties of the snapshot object having the unique snapshot identifier included in the client request. The business logic provider 112 may communicate with the provider services subset manager 116 which then forwards the request to one of the providers within 119. In this example, the provider services subset manager 116 forwards the request to the snapshot provider 117 whereby the snapshot provider 117 may return the properties of the snapshot object to 116 and then to 112 (e.g., returning up the call chain). In one embodiment, one of the properties of the snapshot object returned by the snapshot provider 117 may identify the source LUN. In particular, as described in more detail in following paragraphs, the snapshot object returned by the snapshot provider 117 may include a LUN identifier property, whereby the LUN identifier may map to (or be a pointer to) a LUN object corresponding to the source LUN for the snapshot. The LUN identifier may be, for example, a foreign key of a database table of LUN objects whereby the foreign key serves as a primary key or index uniquely identifying LUN instances in another table, database, or other construct used by the LUN provider 114. Each LUN may have a row in the database table used by the LUN provider 114 whereby each row corresponds to a different LUN and its associated LUN object and the row for a LUN may be uniquely identified or mapped to the LUN's identifier. If a LUN serves as a source LUN for a particular snapshot, the LUN's foregoing LUN identifier is included as a property of the particular snapshot's snapshot object (as returned by the snapshot provider 117).

Once the business logic provider 112 receives the properties for the snapshot object from the snapshot provider 117, the business logic provider 112 may then extract the property of interest for the source LUN identifier and issue another request to the LUN provider 114 passing as an input the source LUN identifier. The LUN provider 114 may return the properties of the LUN object for the source LUN identifier. The business logic provider 112 may return to the client the LUN object properties for the source LUN identifier corresponding to the snapshot identifier of the original client request.

The foregoing is one manner and example of how the business logic provider 112 may be used to facilitate communications between different providers to obtain requested client information. In accordance with techniques herein, associations or relationships may exist between different objects of different providers, such as between the snapshot object and the LUN object described above whereby the LUN object corresponds to that of the source LUN for the snapshot. More generally, such associations or relationships may exist between a first object of a first provider and second object of a different provider. In accordance with techniques herein, such an association or relationship may be represented using a property of the first object (e.g., snapshot object) whereby the property has a value identifying the second object (e.g., source LUN object). When the snapshot provider 117 constructs the snapshot object (such as may be performed dynamically in response to a client request), the snapshot provider 117 may query the database 106 by issuing one or more query requests to the data store 104. The snapshot object may be in accordance with a client object or data model different from the objects and associated data model used by the database 106. The database 106 may include database tables of one or more lower level objects in accordance with a database data model different from the client data model. The database 106 may be queried by the snapshot provider 117 to obtain requested snapshot object properties, including any such properties identifying an association or relationship to another object, where the associations are stored in tables of the database 106.

In connection with populating the tables of the database 106, the drivers 122 collect information of the local service processor A which is reported through a call stack of software layers including code of the admin software layer 126, PAL 108, and data store 104, where such information may then be stored in the database 106. The update manager 124 may generate a request to poll the drivers 122 of processor A and other processors for configuration state information describing the current configuration of the data storage system. The update manager 124 may generate a polling request in response to an occurrence of an event such as an occurrence of a defined polling interval, as well as an occurrence of one or more other defined events. The update manager 124 may issue the request to the admin layer 126 which then obtains the local state information for processor A from the drivers 122. The admin layer 126 then communicates the state information for processor A to the PAL 108 which then communicates the information to the data store 104. Additionally, the admin software layer 126 may communicate with the PAL 108 of processor A to request configuration state information from processor B as illustrated by 118 and described below in more detail. The data store 104 may process the received state information (e.g., for both processor A and B) and then populates the database 106 by performing database operations such as by issuing appropriate database commands including update, insert and/or delete database commands.

In one embodiment described herein, the data store 104 may perform processing to map the collected data such as received from PAL 108 and the admin layer from an admin data model to another database model in accordance with the database 106. The admin data model may be referred to herein as the raw or admin data model where the collected data storage configuration data is in accordance with this admin data model such as used by the lower layers of software below PAL 108. The admin data model may be mapped to a database model of the database 106 (e.g. also analogous to the intermediate data model as may be referred to elsewhere herein). The database model may be further translated or mapped to the client data model which, as described in more detail elsewhere herein, may utilize virtual tables or views generated using queries run against the database tables of the database model and/or admin data model.

PAL 108 may serve as an interface facilitating communications between lower layers or software components (e.g., such as the admin software layer 126 and drivers 122) and upper layers or software components (e.g., such as the data storage 104 and database 106). Upon the occurrence of a polling interval as signaled by the update manager 124, PAL 108 of service processor A may collect data from the local processor A's drivers and may also communicate with other PALs included in other service processors (e.g., service processor B over the CMI connection 118). In turn, the PAL of processor B (not illustrated) queries its local processor B's drivers for the information in a manner similar to that as described for processor A and returns the information to the requestor, PAL of processor A. The requested information from both service processor A's drivers 122 and from other service processors (e.g., as communicated by PAL of processor B) may be returned to the PAL 108 of service processor A, forwarded to data 104 and then stored in database 106. The database of 106 for the collected configuration state information may include data stored in one or more database tables where such tables include one or more rows of data elements. The data store 104 may perform database operations which update the appropriate database tables of 106, and portions thereof, in accordance with the received state information. As described below, the data store 104 may use the techniques herein to map the collected data of the admin data model to data stored in the database 106 in accordance with the database model which is then further used to generate data in accordance with a client data model.

Figure 4:
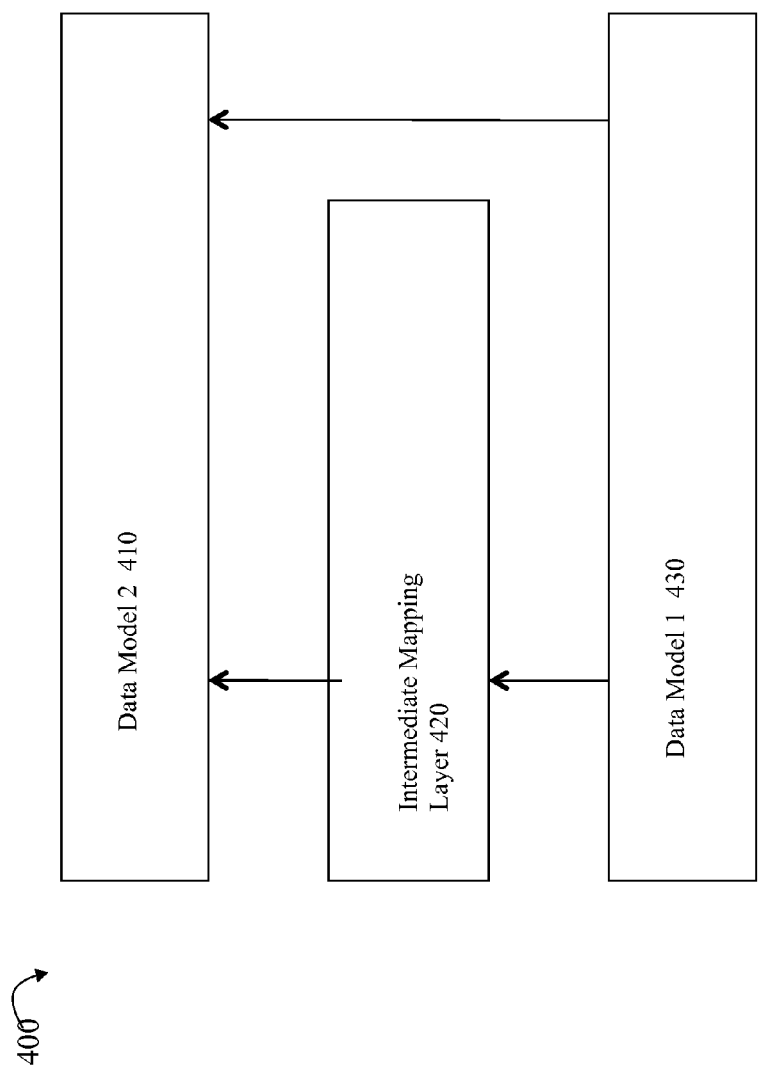
FIGS. 4 and 4A are examples illustrating mapping that may be performed using an intermediate mapping layer in an embodiment in accordance with techniques herein.

Referring to FIG. 4, shown is an example illustrating the general processing that may be performed in an embodiment in accordance with techniques herein. The example 400 includes data model 1 430 (such as the admin data model as at a first or lower layer), an intermediate or secondary mapping layer 420 (which may use an intermediate object model such as the database model mentioned above) and data model 2 410 (such as the client object data model at a third or highest layer). The techniques herein utilize the intermediate layer 420 in connection with mapping or translating first objects of the first data model 430 to second objects of the second data model 410. The data model 1 430 may represent the data model of the admin layer of the collected poling configuration information. Each time a new set of the collected data is received, processing may be performed to map the objects in the first data model 430 to objects of the intermediate mapping layer 420. Additional processing to generate objects of the second data model 410 (e.g., using objects of layers 420 and/or 430) is not performed unless and until there is a request for one or more selected client model objects, where such selected client data model objects are generated "on-demand" (e.g., on the fly) in response to the request using one or more objects from the collected data of the first data model 430 and/or one or more objects from the intermediate mapping layer 420. The techniques herein take advantage of maintaining an up to date intermediate mapping layer 420 set of objects so that when a request to generate an object in accordance with the client model (data model 2) is received, at least some of the processing steps have already been performed/intermediate values obtained through the foregoing use of the intermediate mapping layer 420. In other words, the processing necessary to generate objects of the second data model 410 from objects of the first data model 430 may be partitioned so that the intermediate mapping layer 420 performs at least part of such processing. The remaining processing necessary to generate selected objects of the second data model may be performed on demand/as needed in response to a request for such selected objects.

The foregoing use of the intermediate mapping layer 420 is an alternative, for example, to waiting until the request is received prior to performing all processing necessary to generate the requested objects in the second data model. The foregoing use of the intermediate mapping layer 420 is also an alternative, for example, to generating and maintaining a complete up to date (e.g., cached) set of objects of the second data model. In this latter case without using the intermediate mapping layer, each time a new set of data is collected such as at each polling interval, processing is performed to update the cached set of objects of the second data model in accordance with data changes and data dependencies on such changes. This may be performed even if there is no request for the objects in the second data model and may consume an unacceptable amount of resources in terms of memory usage, processing time, and the like. As will be described in more detail below, an embodiment may have a first layer of software that generates objects of the first data model, a second layer of software that performs processing of the intermediate mapping layer 420 (e.g. which may include generating one or more intermediate objects in accordance with an intermediate object model), and a third layer of software that performs processing to generate objects of the second data model (e.g., using one or more objects generated by the intermediate mapping layer 420 and/or objects included in the first data model 430 generated by the first layer of software). An embodiment may also implement a variation of the foregoing where one or more objects of the second data model may be generated by the second or intermediate mapping layer as well as the third layer and/or one or more intermediate objects (e.g. not included in the first or second data models) may be generated by the third layer as well as the second or intermediate mapping layer.

Various examples and embodiments are set forth below. In one embodiment set forth below, the second or intermediate layer may populate database tables including association database tables. Such association database tables may group objects together, such as in pairs, based on relationships between objects included in a pair. In this case, the processing performed by the second or intermediate layer may include computing and updating such relationships as needed in response to changes or updates as received for objects of the first data model (e.g., data model 1). As described below, the differences in data obtained between two successive polling intervals may be determined by a first software layer such as the admin layer and, the second or intermediate layer may perform processing responsive selectively to only such differences (e.g., based on dependencies of objects used by the second/intermediate layer upon such differences). The intermediate layer may selectively compute the associations based on such differences rather than, for example, computing and updating all associations and rather than, for example, computing and updating complete objects that may be referenced in the association. As will be apparent to those of ordinary skill in the art, use of such associations (as represented using association database tables in examples below) provide an advantage of a reduction in computation time when used in generating an object of the second data model (e.g., data model 2, 410 such as the client data model) when requested/on demand. Furthermore, as also described below, an association database table may utilize only two primary keys per association/relationship represented by a row of the database table, where each of the primary keys identifies an object of the pair being associated with the other object of the pair. By storing the association database table including information representing the relationship between objects rather than requiring each such object of the relationship (where such objects may be included in the second data model) to also be maintained and stored, the amount of memory used and computation performed in response to each polling update may be greatly reduced. Thus, the techniques herein provide an advantage of scalability.

In connection with an embodiment in accordance with techniques herein, communications between an initiator port of the host and a target port of a data storage system may include those related to I/O operations, for example, read and write SCSI operations. The foregoing communications between the host and data storage system may be transmitted over a path or connection defined by two endpoints—the initiator port of a host and the target port of the data storage system. The admin data model may collect information on a connection or a per path basis. In other words, the admin layer may collect data with respect to physical connections. The objects of the admin data model may reflect this level of granularity and concept of paths or connections. However, the admin data model (e.g., corresponding to data model 1 430) may not have objects which correspond to other physical and/or logical entities in the storage system such as a host, storage pool, snapshot, and the like. For example, the admin data model may include a single large path or connection object with information about the initiator port, host including the initiator port, target port, and the like. Information regarding other entities such as the host, storage pool, snapshot, etc. may be included or embedded as properties of the path objects. However, objects of the client data model consumable by a client (e.g. corresponding to data model 2 410) may have other entities including logical entities as the host, storage group, and the like, which may be populated by aggregating, analyzing and/or selectively extracting data with respect to many objects, such as path objects and other object of the admin data model. For example, the user may request a list of hosts, a list of ports on a particular host, a list of all host ports, a list of all target array or data storage system ports, and the like. The client data model may include, for example, a host object, snapshot object, LUN object, storage group object, and the like, as basic elements since such elements as objects are usable in connection with client requests. In order to generate the many different objects of the client data model, multiple instances of admin data model objects may be processed and then selected information may be extracted from one or more such objects. In accordance with techniques herein, the objects of the admin data model are transformed using the intermediate layer and one or more intermediate layer objects may be generated representing the partial processing described above. The intermediate layer objects may include, for example, associations and also intermediate calculations or intermediate processing results performed in advance of the request to generate one or more client model objects produced using such intermediate results (e.g., dependent on the intermediate results). The associations of the intermediate or second layer 420 may define some basic relationships (e.g., between a host and initiator, host and storage group, initiator and path, path and target, path and session, preferred path for particular host, snapshot and source LUN, and the like) used for determining information for one or more client data model objects, such as the snapshot object, LUN object, and the like. Thus, the associations may be maintained and kept up to date in response to each polling interval. However, the remaining processing which may use such associations to extract further information about a particular snapshot, LUN, one or more hosts, initiators, or target ports, and the like, in response to a user request is not performed until such a request is actually received (e.g. on demand). Additionally, the processing may be performed only to generate the objects of the client data model necessary to service the request. Furthermore, in one embodiment, the objects of the client data model generated may not be cached but may rather be generated on demand in response to each request. However, the objects generated by the layers 420 and 430 may be stored, for example, in memory and/or non-volatile storage for subsequent use and updated in response to data received at each polling interval (e.g. next set of collected data in the admin data model). The objects of the client data model 410 may be generated using commands which utilize objects of the layers 420 and/or 430. In an embodiment in which the objects used by 420 and 430 are stored in database tables, the commands may be queries (e.g., such as SQL database queries) to generate views corresponding to the objects of the client data model. The queries may use, for example, INNER JOIN clauses to join multiple database tables and extract the necessary information from objects of layers 420 and/or 430.

The application described herein with respect to an admin data model of objects transformed into another set of objects of the client data model is one exemplary use of the techniques herein with the intermediate mapping layer. Using such techniques, one or more objects of the admin data model may be mapped to one or more objects of the intermediate database model and/or client data model.

Figure 4A:
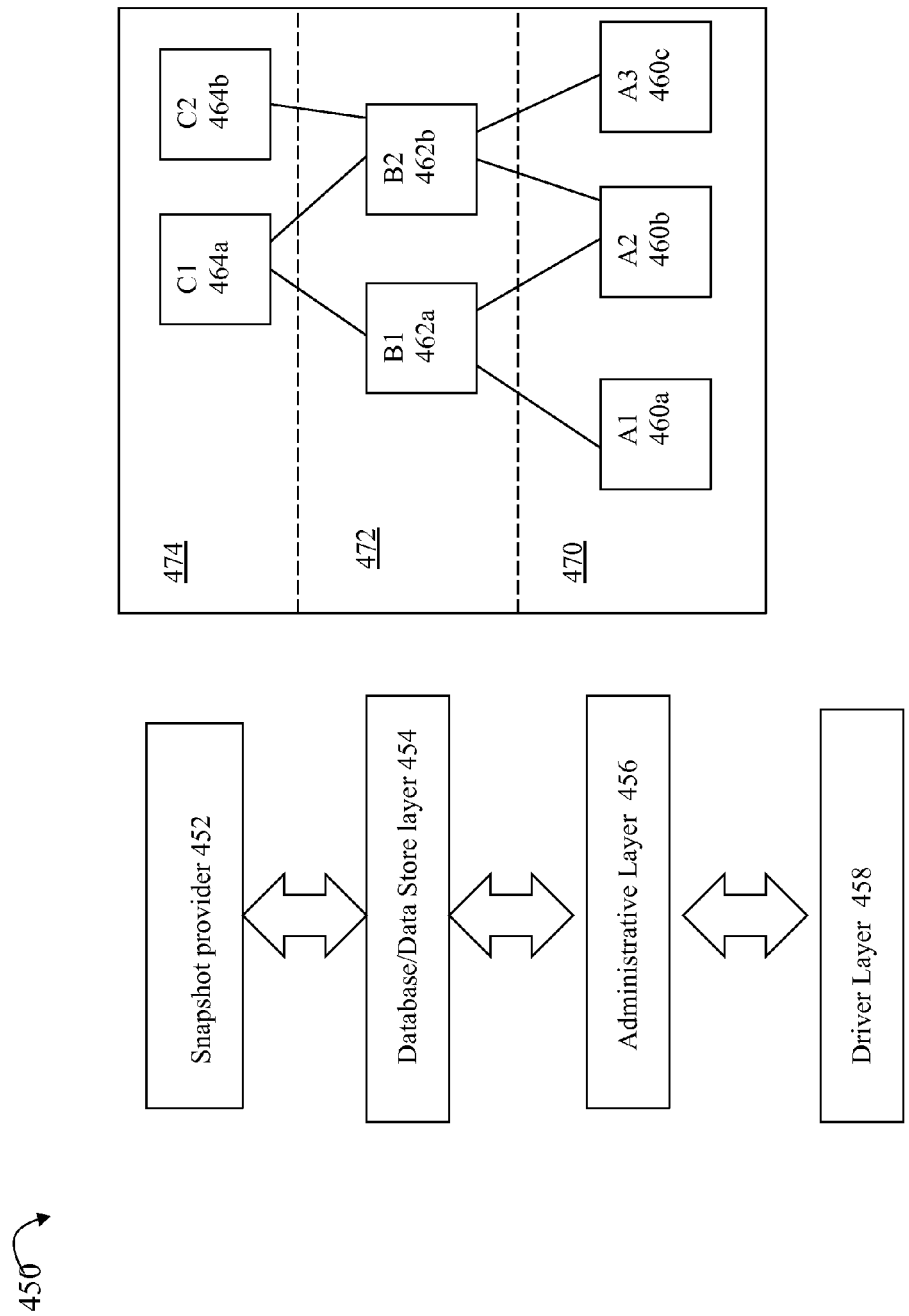

Referring to FIG. 4A, shown is an example illustrating some uses of the intermediate mapping layer in translating objects of a first data model to objects of a second different data model. Consistent with discussions such as in connection with FIGS. 3 and 4, the driver layer 458 may provide data updates to the administrative layer 456 which uses a first data model, the admin data model. Objects of the admin data model may be mapped to other objects used by the intermediate object model, such as of the database/data storage layer 454 (e.g., corresponding to the data model used by 104 and 106 of FIG. 3). Objects of the intermediate object model or database model may be mapped to objects of the client data model such as used by the snapshot provider 452. Elements 474, 472 and 470 correspond, respectively, to the layers 410, 420 and 430 of FIG. 4 and also respectively to layers 456, 454 and 452 of FIG. 4A. Elements 460a-460c may represent objects of the first data model used by layer 456 such as, for example, those of the admin data model. Elements 462a-462b are objects generated by the intermediate layer or database/data store layer 454 and may be in accordance with an intermediate object model. Elements 464a-464b are objects of the second data model used by layer 452 such as objects of the client data model. In the example 450, each of the foregoing objects may have one or more properties or attributes. The lines connecting the various objects of the different layers may illustrate the dependencies between the different objects of the various layers whereby one or more objects of a lower layer may be used in determining properties of objects of an upper layer (470 representing the lowest layer, 472 representing the next layer above 470, and 474 representing the uppermost layer). For example, object 462a includes properties based on properties of objects 460a and 460b whereby properties of 462a may be copied directly from 460a and/or 460b, or otherwise dependent on such properties 460a and/or 460b (e.g., such as if 462a includes a computation using one or more properties of 460a and/or 460b). As another example, client data model object 464a includes properties based on 462a and 462b. For example, as described elsewhere herein in more detail, object 464a may be a snapshot object and object 462b may include the association between the snapshot object and the source LUN.

As described above in an embodiment in accordance with techniques herein, objects of layer 456/470 may be received, for example, in response to a polling interval or other event occurrence. In response to receiving such objects of 456/470, processing may be performed by the intermediate layer 454/472 to generate objects 462a-b. Objects of layer 452/474 are not generated unless and until there is a request for such objects. When such a request is received, for example, for object 464a, processing is performed to generate 464a, using appropriate properties from objects 462a-b. An embodiment may perform processing needed to generate objects 462a-b as intermediate results prior to receiving a request for one or more objects of the layer 452/474 which may use the values of the intermediate results in order to expedite processing of the request once received. Furthermore, since the objects of layer 452/474 are generated on demand, there is no need to cache or store the requested objects of layer 452/474 other than temporarily and then send the generated objects of layer 452 to the client or requester. Thus, caching storage may be conserved using the techniques herein over an implementation which may, in contrast to techniques herein, generate and cache all objects of 452/474 ahead of time prior to receiving a request.

In response to receiving a request for objects 464a-b, the requested objects may be generated using predetermined commands. Such commands may provide for automated extraction, calculations, and/or other processing of objects from layers 472/454 and/or 456/470 to generate values used to populate objects 464a-b. The foregoing are simplistic examples illustrating use of the techniques herein. In accordance with techniques herein, the processing of the mapping layer 454/472 may be performed in response to receiving an initial set of objects of layer 456/470 and also in response to any changes for such objects as may be communicated in a subsequently received updated data set for the objects of layer 456/470. The objects of 452/474 may be generated independently of when objects of layer 456/470 (or updated versions thereof) are received. By using the foregoing partitioning of processing and layers to generate objects of layer 452/474, changes to only objects of the second data model may be made while insulating or minimizing changes needed to other layers 454/472, 456/470 (both code and data objects used therein). For example, the layout of object 464a may change so that an additional property value is added. The updated object structure for 464a may be made by simply modifying the commands to extract data, for example, from object 462a or 462b. Furthermore, objects or properties of objects, included in layer 454/472 may be selectively updated responsive to changes in objects used in layer 456/470. In this way, each object in 454/470 may be selectively updated/recalculated based upon objects of 454/470 that are dependent upon changes to properties/objects in 456/470. Similarly, objects and properties of 452/474 may be selectively updated dependent upon changes or updates to properties/objects of 454/472.

The foregoing example of FIG. 4A represents one general way in which the techniques herein may be used. To further illustrate other ways in which the techniques herein may be used, what will now be described is an example using the data storage configuration information and associations as may be used by the second or intermediate mapping layer in an embodiment.

Figure 5:
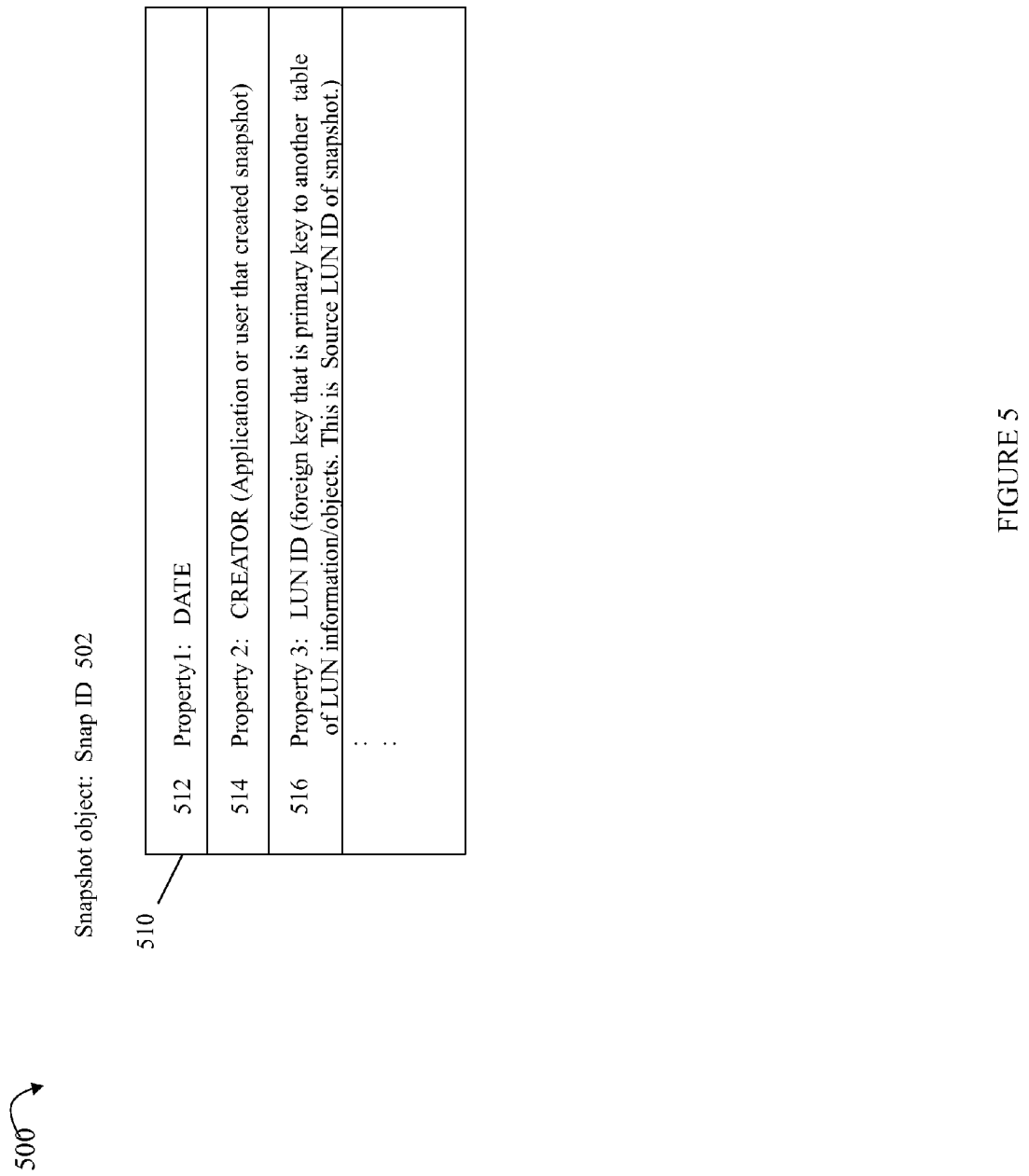
FIGS. 5-7, 10 and 11 are examples of objects corresponding to logical entities and associations that may be used in an embodiment in accordance with techniques herein.

Referring to FIG. 5, shown is an example of a snapshot object as may be constructed and used by the snapshot provider in an embodiment in accordance with techniques herein. The example 500 includes a snapshot object 510 with properties 512, 514 and 516. Each particular instance of a snapshot object may be uniquely identified by a snapshot identifier or snap ID 502. In this example, the snapshot object 510 may include property 512 identifying a date as to when the snapshot was made, property 514 identifying the application or user that requested the snapshot, and property 516 identifying a LUN ID of the source LUN for the snapshot described by the object 510. Element 516 represents a property that is an association or relationship to another object instance of a different object type in another structure, such as another database table or structure. In this example, the LUN ID of 516 may be a foreign key that is a primary key or index into another table of LUN objects.

Figure 6:
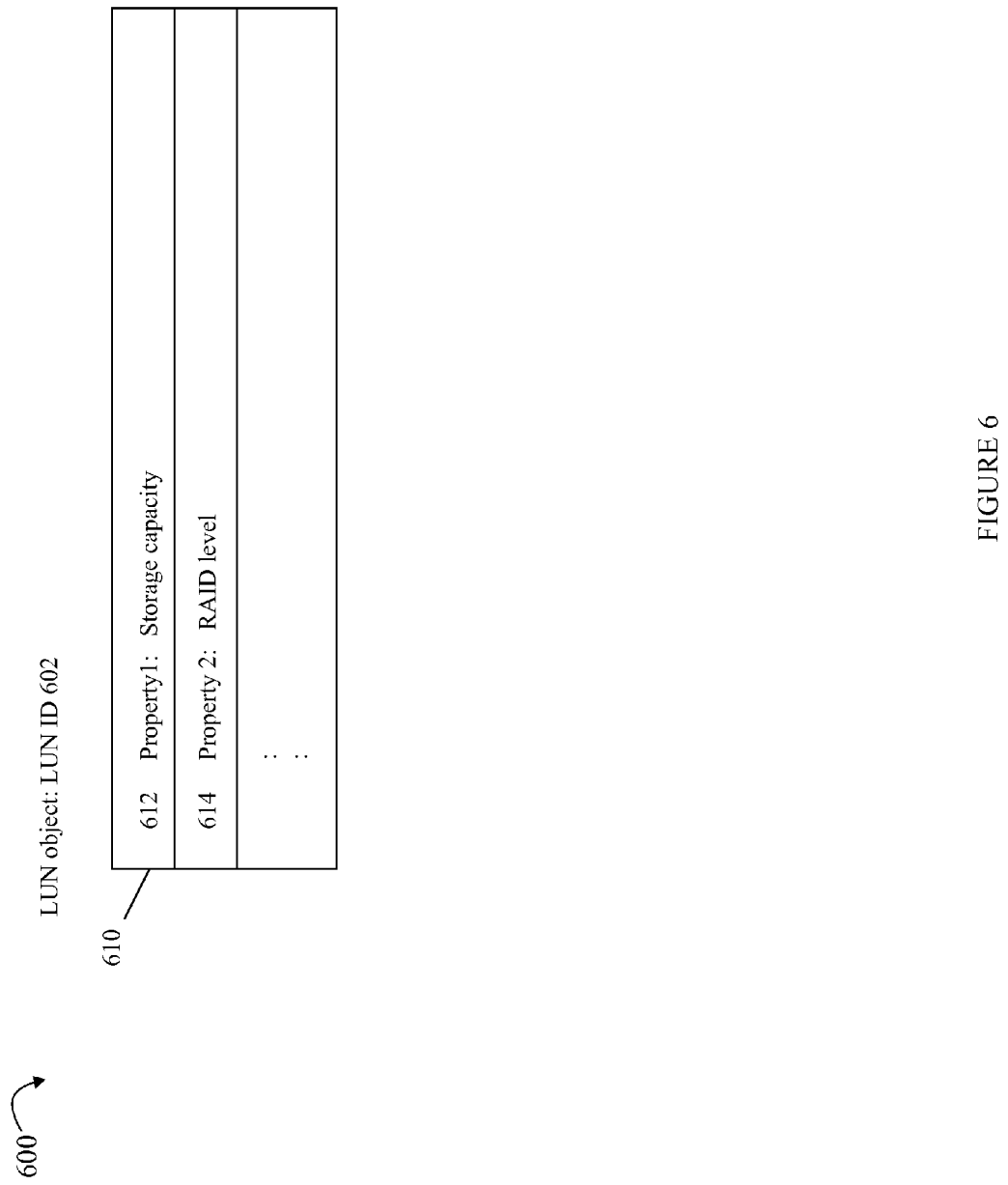

Referring to FIG. 6, shown is an example of a LUN object as may be constructed and used by the LUN provider in an embodiment in accordance with techniques herein. The LUN object 610 may include property 612 identifying the LUN storage capacity and property 614 identifying the RAID level for the LUN described by 610. Element 602 may represent the unique LUN ID used by the LUN provider to identify properties of a LUN instance. For example, in one embodiment, the LUN ID 602 may be the LUN's WWN (world wide name or identifier). In one embodiment, the LUN objects of the LUN provider may be objects of the client data model generated dynamically or on demand in a manner similar to that as described herein for snapshot objects. As a variation, the LUN objects of the LUN provider may be included in the client data model but may alternatively not be generated on demand. In one embodiment as described above where the LUN provider is included in legacy code and other providers of 119 of FIG. 3 are included in newer-rewritten modules, it may be that the LUN provider provides client data model objects which are not yet generated on demand as by the newer providers of 119. In any event, FIG. 6 shows an example of information that may be included in an instance of the LUN object 610 in an embodiment in accordance with techniques herein.

Figure 7:
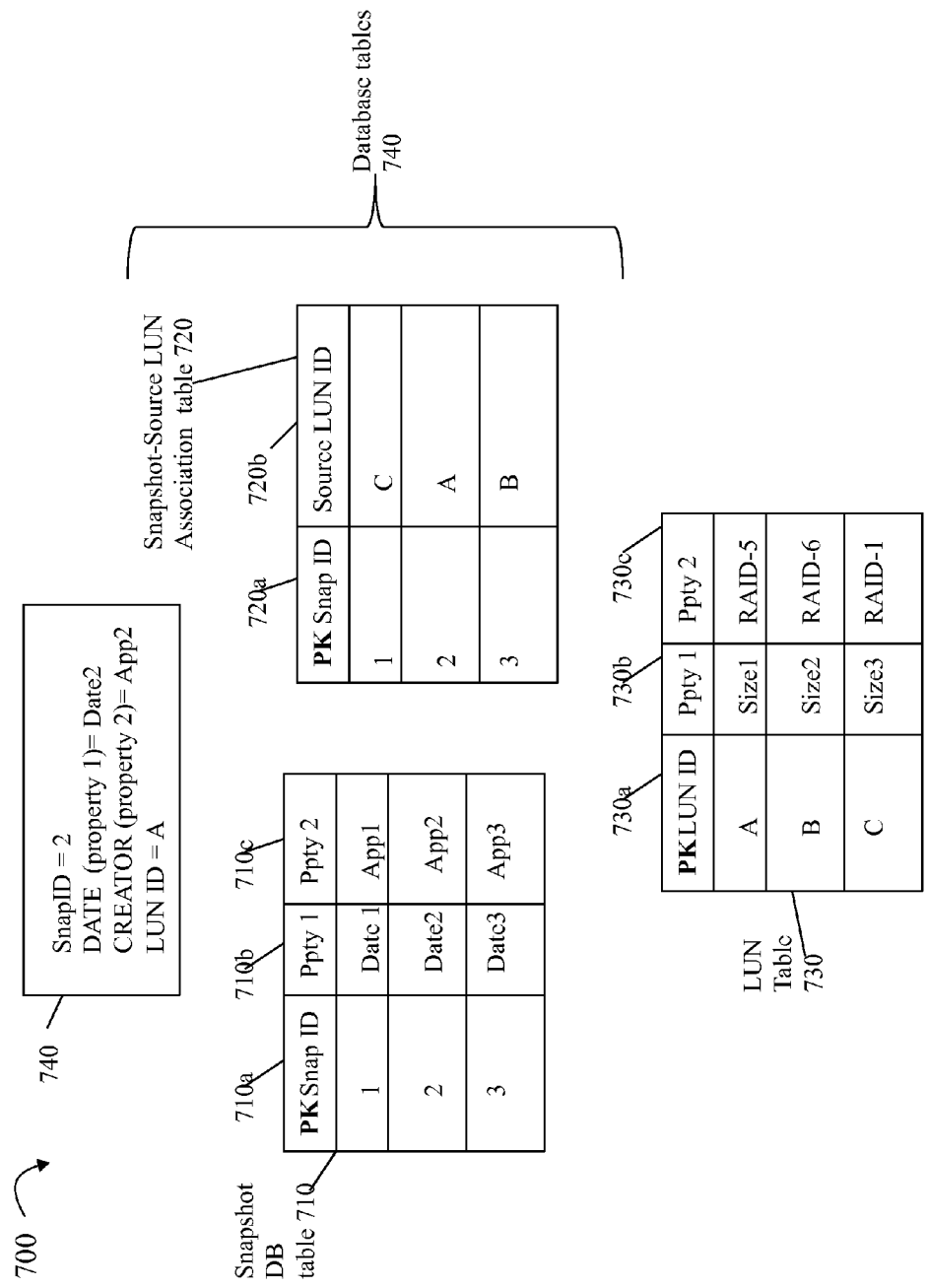

Referring to FIG. 7, shown is an example of data tables that may be used in an embodiment in accordance with techniques herein. The tables 710, 720 may be database tables 740 included in the database 106 of FIG. 3 in accordance with the database model (e.g., intermediate mapping layer data model). Table 710 includes snapshot object property information for properties 1 and 2 (e.g., for 512 an 514 of FIG. 5) and table 720 includes snapshot object property information for property 3 (e.g., for 516 of FIG. 5 for the association or relationship to the source LUN object). The tables 710, 720 may be queried by the snapshot provider in connection with generating a snapshot object on demand. For example, an SQL query including INNER JOIN statements may be used to combine properties from tables 710 and 720 to construct one or more snapshot objects.

The table 720 is a table of associations between a snapshot object and a source LUN object where table 720 may be generated by the second or intermediate mapping layer. In other words, the second mapping layer may determine such associations or relationships between objects although the actual instances of the objects of the second data model themselves may not be generated as part of the second or intermediate mapping layer processing. In this embodiment, objects of 740 generated by the second mapping layer in FIG. 7 may be stored in database tables having one or more primary keys (PKs). A property of an object which is a PK for a database table including that object is denoted by the PK designation by the attribute (e.g, Snap ID is the PK for tables 710 ad 720). Each row of table 710 may be joined with a row of table 720 to obtain the aggregate set of properties snapshot objects (as described in FIG. 5) of the snapshot provider. Table 730 may represent the LUN table including LUN object information used by the LUN provider. The table 730 may include a row for each LUN object having a format as described in connection with FIG. 6. Table 730 illustrates the PK as the LUN ID 730a where each of the source LUN IDs of 720b may be used as an index or foreign key into table 730. Each value in an entry of 720b has a unique matching value in column 730a of table 730.

Each association object included in table 720 may include only two primary keys associated with two other objects denoting the association or relationship between such object instances.

With reference back to FIG. 5, the snapshot object 510 may be generated by extracting data from one or more objects of tables 710, 720 of the intermediate database layer on demand. As such, in one embodiment, the one or more snapshot objects may be views or virtual tables produced using queries of one or more tables of the lower intermediate database layer.

At runtime during operation of the system, a set of admin data objects in accordance with the admin data model may be received upon the occurrence of every polling period. In response to receiving a set of such data, processing may be performed to determine differences with respect to the current set of data. In response to any determined changes or differences, the second or intermediate layer may perform operations to appropriately update, delete and/or create new objects with respect to those illustrated in tables 740. No snapshot objects may be yet created in response to the determined changes or differences in accordance with each new set of admin data model data received. Rather, selected one or more snapshot objects as illustrated in FIG. 5 may be created using one or more database tables, such as tables 710, 720, in response to receiving a client request in order to service the received request using the selected objects.

As mentioned above, the snapshot object may be created by extracting necessary data from tables, such as tables of the database 106. Such extraction may be performed using SQL queries or other suitable commands. As an example with reference to FIG. 7, INNER JOIN clauses of database queries may be used to extract the necessary data from such tables in generating a single requested snapshot object. The following is an example of an SQL query as may be performed to construct a snapshot object (denoted as SNAP2) for the snapshot having a snap ID of 2 as represented by element 740 of FIG. 7. For example, the client request may identify SnapID "2" as the snapshot for which a LUN object corresponding to the source LUN of SnapID "2" object is requested. For shorthand purposes, table 710 is denoted as T1 and table 720 is denoted as T2 in the following SQL statement:

1 CREATE VIEW "SNAP2" AS SELECT
2 T1.SnapID AS SnapID,
3 T1.Ppty1 as DATE,
4 T1.Ppty2 AS CREATOR,
5 T2.Source LUN ID AS LUN ID
6 FROM T1 INNER JOIN T2
7 ON T1.SnapID=T2.SnapID AND T1.SnapID="2"

In element 740, the snapshot object has a primary key of SnapID=2 with properties denoted by DATE (property 1), CREATOR (property 2) and LUN ID (property 3).

A JOIN clause combines records (e.g. rows or entries) from two or more database tables resulting in a set that can be saved as a table or used as is. A JOIN is a means for combining fields from two tables by using values common to each. An INNER JOIN creates a new result table by combining column values of two tables (e.g. A and B) based upon the join-predicate. The query compares each row of A with each row of B to find all pairs of rows which satisfy the join-predicate. When the join-predicate is satisfied, column values for each matched pair of rows of A and B are combined into a result row. The result of the join can be defined as the outcome of first taking the Cartesian product (e.g. intersection or cross join) of all records in the tables (combining every record in table A with every record in table B). All records which satisfy the join predicate are returned. The From clause of the Select statement of 203 as included in line 6 above lists the tables to be joined. Line 7 specifies the predicate or criteria which must be satisfied using the ON keyword. For the matching joined table entry, the above statement in lines 2-5 denote the properties of the database tables 710, 720 which are extracted and mapped to corresponding properties of the snapshot object 740. The two tables that are INNER JOINed are T1 710 and T2 720 having matching entries meeting the criteria of the ON clause (e.g., T1. SnapID=T2. SnapID AND T1. SnapID="2"). Thus, the foregoing illustrates how an association may be used in connection with an INNER JOIN to extract information from objects of lower layers (e.g., intermediate and lower layer) to generate object 740 in the upper most layer.

The snapshot object 740 may be constructed by the snapshot provider and returned to the business logic provider which then extracts the property LUN ID="A" (property 3) and passes this to the LUN provider. In turn, the LUN provider may return the object or row 1 of the table 730 where the LUN ID of column 730a is "A".

In the foregoing, it should be noted that the database may include one or more tables having different configurations and organizations than as illustrated above for purposes of example of the techniques herein.

Figure 8:
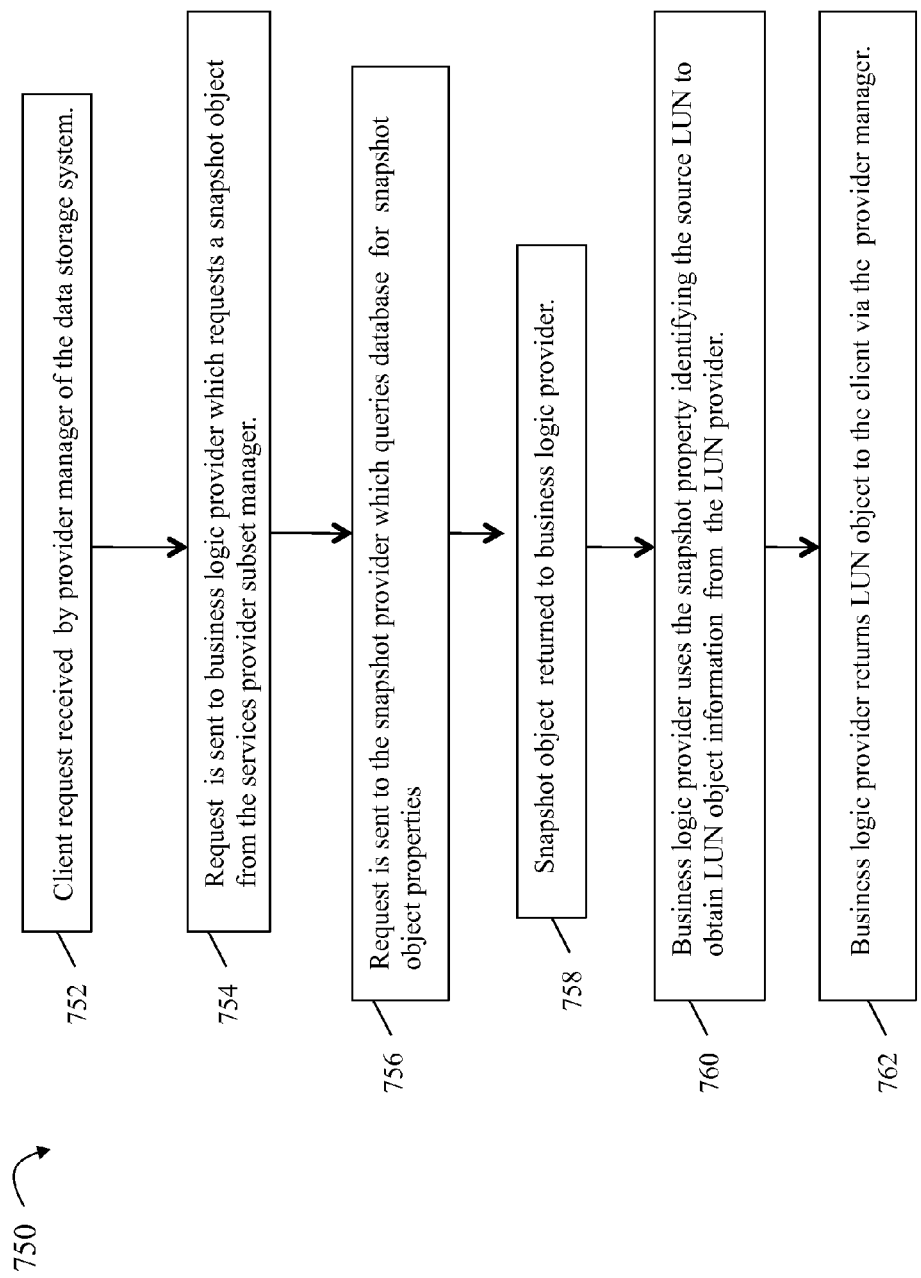
FIGS. 8, 12A, 12B and 21 are flowcharts of processing steps that may be performed in an embodiment in accordance with techniques herein.

Referring to FIG. 8, shown is a flowchart of processing steps as may be performed in an embodiment in accordance with techniques herein. The flowchart 750 summarizes processing steps described above in connection with creating a snapshot object and using a property thereof denoting an associated source LUN to obtain a LUN object corresponding to the source LUN for the snapshot. At step 752, a client request is received by the data storage system at the provider manager. The client request may identify the SnapID of the snapshot. For example, the SnapID may be 2 as described above. The client may be requesting a LUN object for which the source LUN of the snapshot denoted by SnapID. At step 754, the request is sent to the business logic provider which issues a request to the services provider subset manager for the snapshot object having the SnapID=2. At step 756, the services provider subset manager requests the snapshot object for SnapID=2 from the snapshot provider. The snapshot provider queries the database to obtain the information for the snapshot object (e.g., the snapshot object properties). At step 758, the snapshot object including the snapshot object properties is returned to the business logic provider. At step 760, the business logic provider uses the snapshot property identifying the source LUN to obtain the desired LUN object information from the LUN provider. In step 762, the business logic provider returns the LUN object for the source LUN to the client via the provider manager.

In connection with the foregoing, the database tables may be used to store foreign primary keys of other data structures as may be used by other providers such as the LUN provider. The business logic provider may be characterized as a coordinator and collector of information from various providers in order to return requested information to the client. In one aspect, the business logic provider may function as a layer that insulates the client from underlying data model changes and also any changes in the business logic operations/tasks performed to obtain the data requested by the client.

In connection with the components described in connection with FIG. 3, other providers as may be included in 115 or 120 may be a CLONE provider (e.g., return information about clones such as copies of LUNs), PROVISIONING provider (e.g., to return information regarding data storage provisioning), STORAGE POOL provider (e.g., to return information regarding a defined storage pool from which LUNs may be formed/created), MIRROR PROVIDER (e.g., to return information about LUN mirrors), and the like.

What will now be described is another example in connection with a storage pool provider as may be included in connection with element 120 of FIG. 3 where the storage pool provider may also query the database 106 in connection with constructing storage pool objects in a manner similar to that as performed by the snapshot provider 117.

Figure 9:
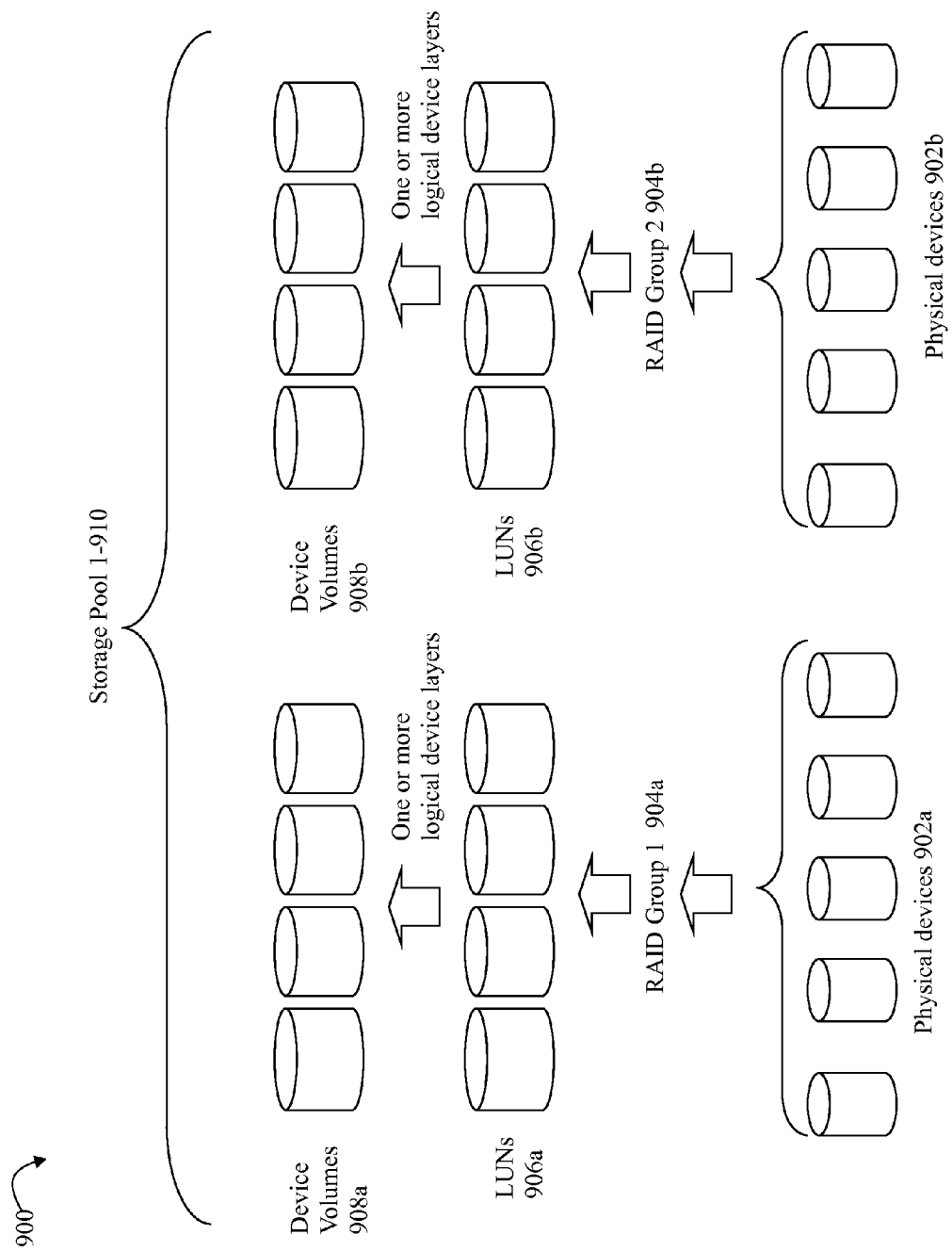
FIG. 9 is an example representing storage pools, and LUNs thereof, that may be formed in an embodiment in accordance with techniques herein.

Referring to FIG. 9, shown is an example representing storage pools that may be formed in an embodiment in accordance with techniques herein. The example 900 illustrates how storage pools may be constructed from groups of physical devices such as by a storage pool provider. For example, RAID Group 1 904a may be formed from physical devices 902a. The data storage system may form the RAID group 1 904a based o the particular RAID level and configuration for the type of storage pool being formed. For example, for physical devices 902a on a first data storage system type when forming a storage pool, RAID-5 may be used in a 4+1 configuration (e.g., 4 data drives and 1 parity drive). The RAID Group 1 904a may provide a number of data storage LUNs 906a. An embodiment may also utilize one or more additional logical device layers on top of the LUNs 906a to form one or more logical device volumes 908a. The particular additional logical device layers used, if any, may vary with the data storage system. It should be noted that there may not be a 1-1 correspondence between the LUNs of 906a and the volumes of 908a. In a similar manner, device volumes 908b may be formed or configured from physical devices 902b. A storage pool may be defined as including one or more RAID groups corresponding to a lower level in the storage allocation hierarchy generally represented in FIG. 9. Thus, one or more LUNs may be formed from a storage pool. The storage pool 1 910 of the example 900 illustrates two RAID groups being used to define a single storage pool although, more generally, one or more RAID groups may be used to form a storage pool in an embodiment using RAID techniques.

The data storage system policies and practices may define how to configure or form the storage pools. FIG. 9 illustrates one methodology that may be used to form storage pools in an embodiment.

In connection with constructing such storage pools and also providing information about existing storage pools, a storage pool provider may be used in an embodiment in accordance with techniques herein. The storage pool provider may be, for example, one of the other providers 120 of FIG. 3. In a manner similar to that as described above where the snapshot provider provides information regarding snapshots for client data model objects, the storage pool provider may construct a storage pool object, which is a client data model object constructed on the fly or dynamically, in response to a client request. Such client data model objects may not be stored as a separate entity in a database but may rather be created when requested using database queries.

Figure 10:
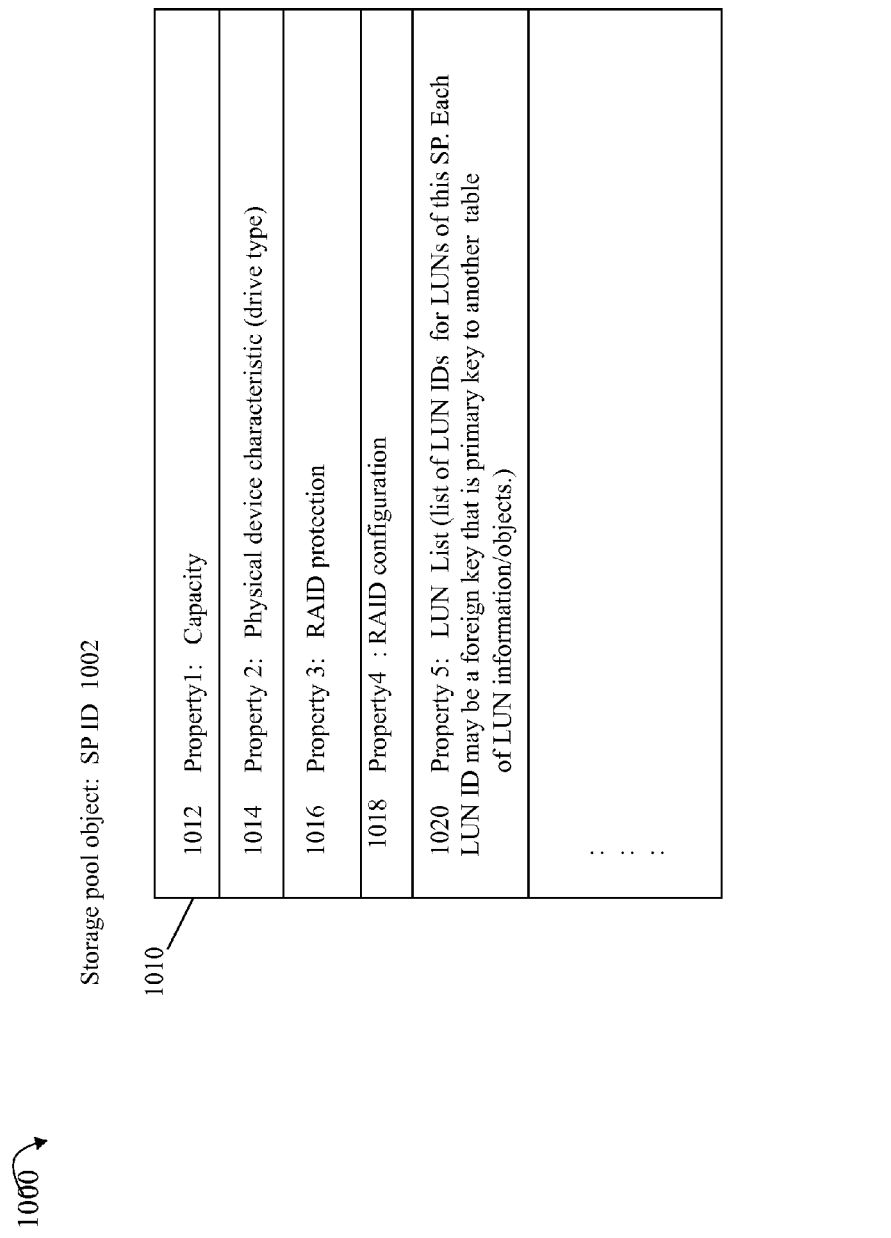

Referring to FIG. 10, shown is an example of a storage pool object as may be used in an embodiment in accordance with techniques herein. Each storage pool may be uniquely identified by a storage pool identifier or SP ID 1002. The storage pool object may include properties of 101 including property 1 1012 identifying the storage pool storage capacity, property 2 1014 identifying one or more physical device characteristics of physical drives included in the storage pool, property 3 1016 identifying the RAID protection, if any, of the storage pool, property 4 1018 identifying the RAID configuration (e.g., number of data and parity drives for the particular RAID protection level denoted by 1016), and property 5 identifying a list of LUNs configured from this storage pool. It should be noted that element 1014 may identify, for example, the drive type and associated drive characteristics such as whether the storage pool includes flash or SSDs (solid state drives), SATA rotating disk drives of a particular RPM, FC (fibre channel) rotating disk drives of a particular RPM, and the like.

Element 1020 may identify a list of associated LUNs by a list of LUN IDs for LUNs created from the storage pool. As described above with the snapshot provider, each LUN ID may be a foreign key that is a primary key to another table of LUN information/objects such as included in the LUN provider. A client may issue a request to return an instance of a storage pool object as described in connection with FIG. 10. With reference to FIG. 3, the client request may be forwarded to the business logic provider, then to the provider services subset manager and then to the storage pool provider. In response, the storage pool provider may query the database to construct the storage pool object from one or more database tables.

Figure 11:
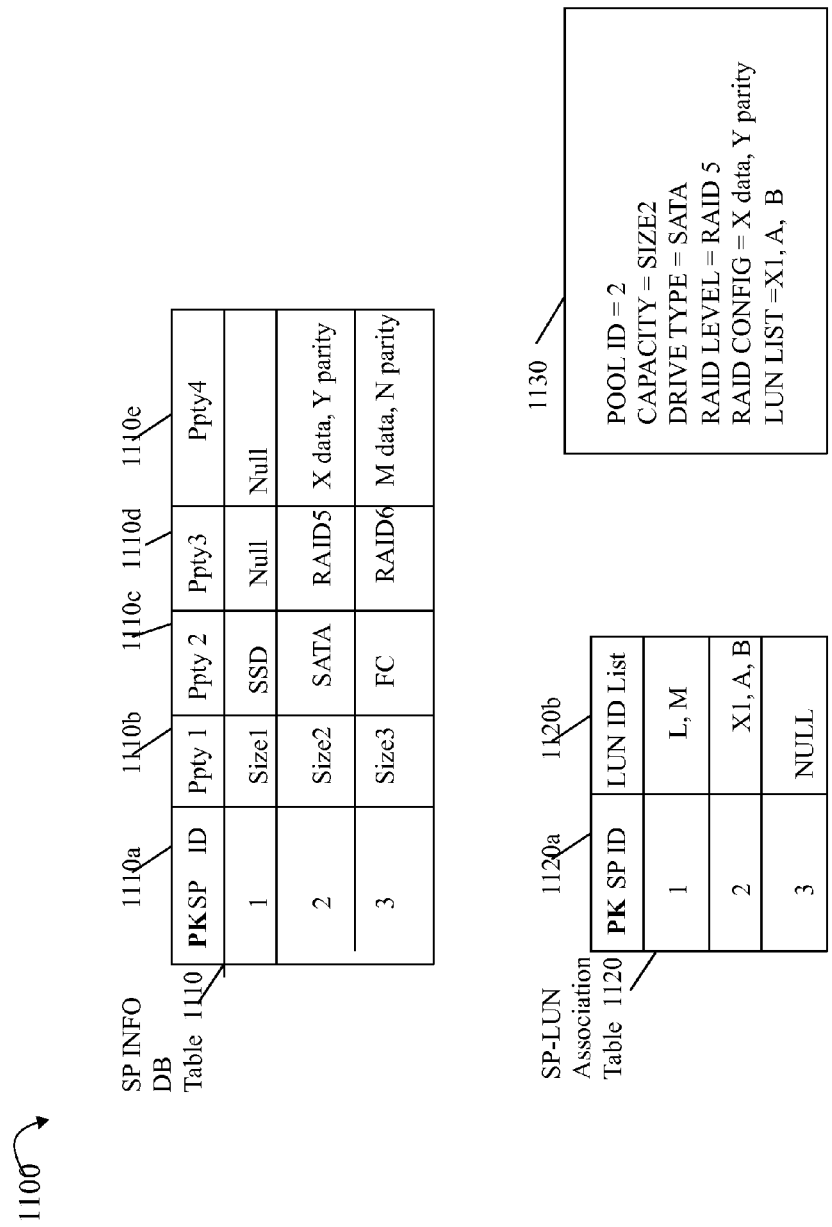

FIG. 11 is an example of two tables that maybe included in the database and used in connection with the query to extract information to construct the storage pool object. The example 110 includes tables 1110 and 1120. Table 1110 includes a first portion of the storage pool properties (e.g., properties 1012, 1014, 1016 and 1018 of FIG. 10). Table 1120 includes the remaining storage pool property denoted by 1020 of FIG. 10. Each of the tables 1110, 1120 have PK of SP ID. Assume the client request is to obtain a storage pool object 1130 for a storage pool having SP ID=2, then the corresponding SQL query where table 1110 is denoted by T1, table 1120 is denoted by T2, and the created storage pool object is denoted by POOL2:

1 CREATE VIEW "POOL2" AS SELECT
2 T1.SP ID AS POOL ID,
3 T1.Ppty1 as CAPACITY,
4 T1.Ppty2 AS DRIVE TYPE,
5 T1.Ppty3 AS RAID LEVEL,
6 T1.Ppty4 AS RAID CONFIG.
7 T2.LUN ID list AS LUN LIST
8 FROM T1 INNER JOIN T2
7 ON T1.SP ID=T2.SP ID AND T1.SP ID="2"

In element 1130, the storage pool object has a primary key of SP ID=2 with properties denoted by CAPACITY (property 1 1012 of FIG. 10), DRIVE TYPE (property 2 1014 of FIG. 10), RAID LEVEL (property 3 1016 of FIG. 10), RAID CONFIG (property 4 1018 of FIG. 10) and LUN LIST (property 5 1020 of FIG. 10).

The storage pool provider may return the object 1130 to the business logic provider which, in turn, may return the object 1130 to the client. The client may select a particular one of the lists from the LUN LIST "X1, A and B" such as from a displayed list. For each item on the LUN list, the corresponding LUN ID may be displayed. In response to selecting one of the LUNs, the client may issue another request processed by the business logic provider to obtain LUN object information for the selected LUN as identified by its LUN ID. The business logic provider may obtain the requested LUN information from the LUN provider as described above and return the LUN object information to the client.

As a variation to the foregoing, in addition to returning the list of LUNs configured from storage of the storage pool, the business logic provider may also return additional information to the client regarding, for example, an amount of storage of the pool's capacity that has been allocated for use with the LUNs X1, A and B. In this case, the business logic provider may obtain LUN object information for each of the LUNs X1, A and B from the LUN provider as described above (e.g. using the LUN IDs of the list), extract the required property from each LUN object related to storage capacity (e.g., see 612 of FIG. 6), and sum the storage capacities of all LUNs from the list thereby determining an amount of the pool's capacity which has been allocated for use with the LUNs X1, A and B. The business logic provider may return to the client the storage pool object 1130 in combination with the foregoing sum. The foregoing is just another example illustrating use of the database tables to create the storage pool object on demand and use foreign keys of the storage pool object to obtain associated or related LUN information from another provider.

It should be noted that the database, data store, mapping layers, associations, and the like, as described herein are also described in more detail in U.S. patent application Ser. No.

13/065,735, filed Mar. 29, 2011, TECHNIQUES FOR MAPPING DATA MODELS USING AN INTERMEDIATE PROCESSING LAYER, to Kim et al., which is incorporated by reference herein.

Figure 12A:
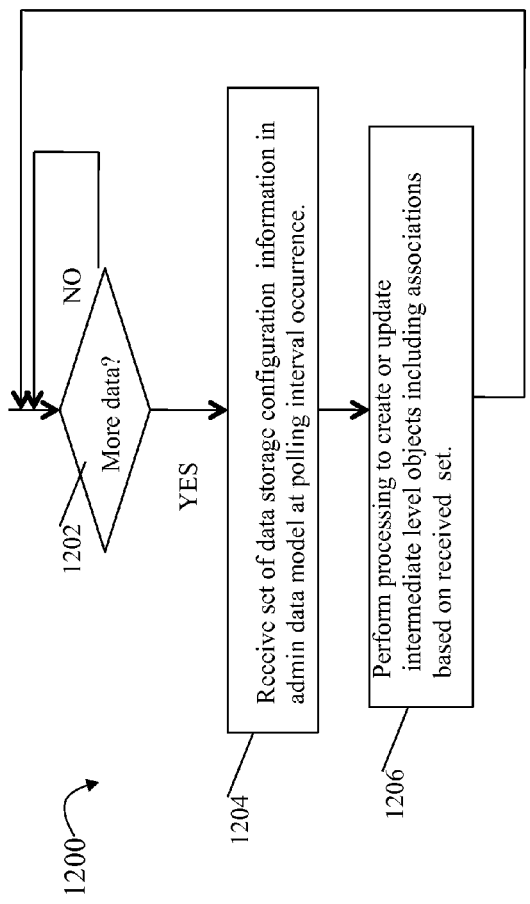
Figure 12B:
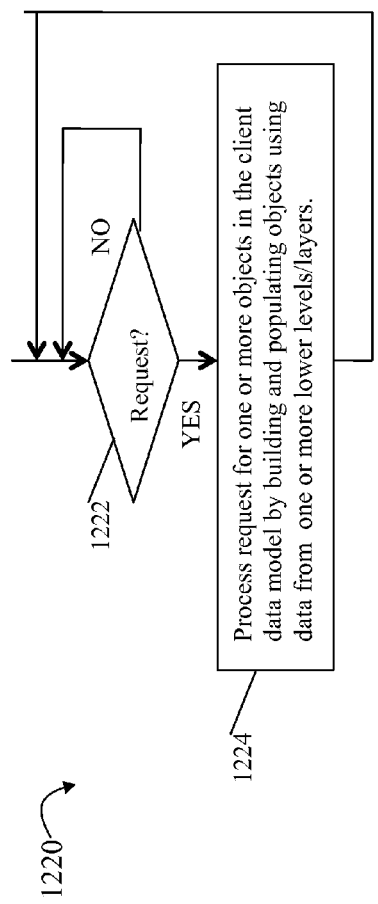

Referring to FIGS. 12A, 12B, shown are flowcharts of processing steps that may be performed in an embodiment in accordance with techniques herein. The steps of 1200 and 1220 summarize processing described above. The flowchart 1200 illustrates steps that may be performed in connection with processing data collected at polling intervals. At step 1202, a determination is made as to whether the next polling interval has occurred. If not, processing waits at step 1202 until such time has occurred when a set of data has been collected in accordance with the admin data model such as by the layer. At step 1204, the collected data in accordance with the admin data model may be received by the data store 104 of FIG. 3. At step 1206, the data store 104 or other module as may vary with embodiment may perform processing as associated with the intermediate or secondary mapping layer to create and/or update objects generated by the intermediate layer. Such objects may include associations and/or other intermediate objects not included in the second or client data model. Alternatively, an embodiment also have the second mapping layer generate one or more objects of the client data model. The foregoing may vary with embodiment and usage of the techniques herein. From step 1206, control returns to step 1202 to wait for the next set of collected data in accordance with the admin data model.

With reference to FIG. 12B, shown is a flowchart of processing steps that may be performed in an embodiment of the techniques herein to process a received request for one or more client data model objects. At step 1222, a determination is made as to whether a request for one or more client data model objects has been received. If not, processing waits at step 1222 until such a request is received. In response to receiving the request, control then proceeds to step 1224 to processing the request for one or more objects of the client data model. Step 1224 may include generating the requested client objects using one or more objects generated by the intermediate layer (e.g., 420 of FIG. 4) or otherwise included in the collected data of the lowest layer in accordance with the admin data model. Step 1224 may include generating one or more client model data objects on demand such as using commands to extract the necessary data as described above by generating views from real database tables including objects generated by layer 420 or included in the admin data model.

As described above with reference to FIG. 3, the business logic provider 112 may be characterized as a middle layer functioning in one aspect as a bridge between the client and other providers (e.g., providers of 119, 114 and 115) to perform an operation of a request. In another aspect, the business logic provider 112 may be characterized as a gathering point for gathering information between horizontal components, such as the other providers, whereby the business logic provider may gather information from any of the other providers and the client may issue requests to the business logic provider directly rather than have the client communicate directly with each of the one or more other providers. In this manner, the business logic provider 112 may provide the client with an interface used to invoke code of the business logic provider 112. Such code of business logic provider may perform consolidated processing that encapsulates communications between multiple other providers and may perform other processing, such as validation processing described below, rather than expose the client to the different interfaces of all the other providers necessary to perform a desired client request and rather than have the client be responsible for performing such validation processing.

In one embodiment, the components of 119 may be included in a first framework and the components 112, 114 and 15 may be included in a second framework different from the first framework. All providers in the same framework may communicate with one another using one common set of intra-framework or inter-provider communications for use within the single framework. Each framework may have its own framework-specific set of classes or other definitions used by providers within the single framework. However, modules or providers in different frameworks cannot utilize such intra-framework communications (the communications used between providers of the same framework) to communicate. As described above and also in following paragraphs, the business logic provider facilitates communications between providers in the two frameworks (e.g. such as between the storage device or LUN provider and the snapshot provider). The business logic provider may also use data from such different providers of different frameworks and may perform additional processing, such as extra checks for valid conditions to ensure desired restrictions are not violated prior to performing processing for one or more operations of a client request. For some operations, the business logic may perform processing based on defined associations identifying relationships between objects used by different providers and also between objects of different frameworks. There may also be logic embodied in the business logic provider to perform runtime checks or validation of existing conditions for one or more objects. More specifically, the business logic provider may perform such runtime checks that may use, for example, information of two associated objects of the same or of different frameworks, to ensure a valid or desired state exists with respect to the requested operation on the two associated objects. This may be characterized as validation processing or restriction checking to ensure that one or more entities in the data storage system have a suitable current state to perform a requested operation. The state of an entity may be characterized by information of an object representing that entity, such as by the mere existence of a particular object, based on defined object properties, and the like.

What will now be described are various examples of such validation processing as may be performed by the business logic provider to determine whether any one or more defined restrictions relevant to performing an operation of a client request are violated.

As a first example, consider a case where a LUN, LUN A, is configured for mirroring to have a primary copy or source of LUN A data and a second copy that mirrors the primary copy. Processing may be performed to synchronize the primary or source copy with the second copy that mirrors the primary copy. The above-mentioned mirroring configuration or relationship for LUN A may have an associated state of active or inactive. When active, the system performs processing to keep the primary and second copies of the data synchronized thereby propagating any writes or modifications made to the primary also to the second copy. The active state may also be referred to as an unfractured mirror state. In contrast, when the mirroring relationship is inactive, the system does not perform the above-mentioned processing to keep the primary and second copies of the data synchronized. The inactive state may also be referred to as a fractured mirror state. A client may issue a first request to create a snapshot of LUN A, denoted as SNAP LUN A, at a first point in time. This first request may be issued to the business logic provider. At a second later point in time, the client may issue a second request to the business logic provider to restore LUN A to its previous snapshot, SNAP LUN A, taken and the prior first point in time. If the restoration operation is performed, the result may be that the data of LUN A is restored to its previous state from the first point in time as reflected in SNAP LUN A. In connection with this second client request, one restriction may be that this restore operation may be restricted while the above-mentioned mirroring relationship is still active. In other words, the business logic provider may perform processing prior to performing the above-mentioned second request to restore LUN A to its previous snapshot SNAP LUN A to determine whether LUN A has an active mirroring relationship. If it is determined that this restriction is violated thereby indicating that LUN A has an active mirroring relationship at the time the restoration request is made, then the business logic provider may take any suitable action. For example, as a first action, the business logic provider may return an error message to the client and fail to perform the restoration operation. As another action, the business logic provider may alternatively and automatically take a corrective action to temporarily fracture the mirroring relationship thereby making the mirroring relationship inactive, perform processing to implement the request and restore LUN A to its previous snapshot SNAP LUN A, and then unfracture the mirroring relationship thereby making the mirroring relationship once again active. As yet a third possible action, the business logic provider may take the above-mentioned corrective action of the second action but perform such correction after notifying the client of the current unfractured or active mirroring relationship and also receiving confirmation from the client to proceed with such corrective action.

Figure 13:
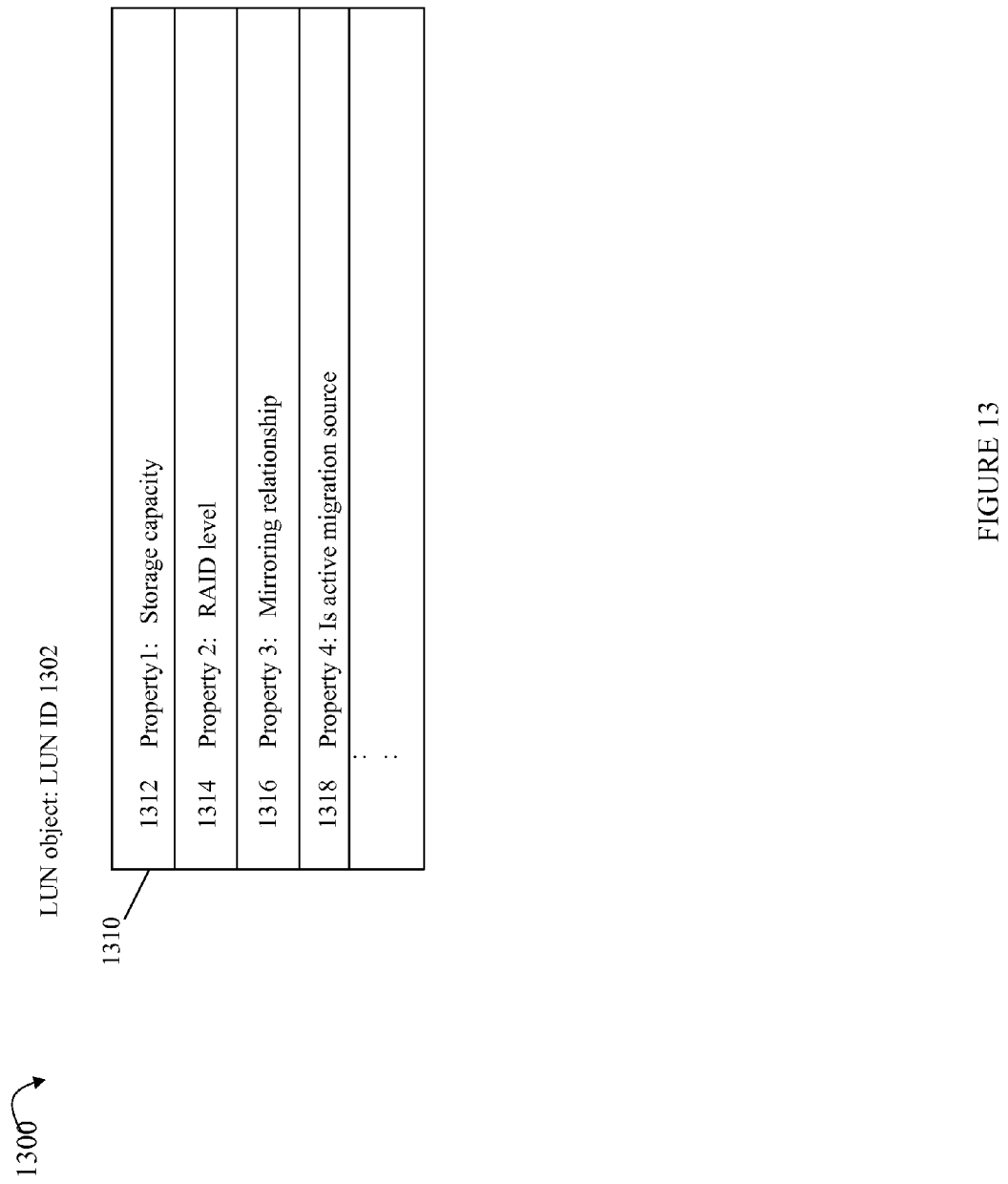
FIGS. 13, 15 and 18 are examples illustrating objects that may be used in an embodiment in accordance with techniques herein.

In connection with the second client request to restore LUN A to its snapshot SNAP LUN A, the snapshot provider includes information about the snapshot SNAP LUN A but may not have any information regarding whether there are any currently active mirroring relationships for LUN A. With reference to FIG. 5, the second request from the client may specify the Snap ID of the snapshot for SNAP LUN A to be used for the restoration. The business logic provider may communicate with the snapshot provider to obtain an instance of the snapshot object for SNAP LUN A and use the third property, LUN ID 516 of the snapshot object in connection with identifying the LUN ID which is used by the LUN provider to obtain LUN information from a LUN table. In this manner, the business logic provider may receive the second client request and communicate with the LUN provider (e.g., storage device provider as also more generally referred to herein) using the LUN ID for LUN A to obtain information about whether LUN A currently has an active mirroring relationship. Consistent with description elsewhere herein and referring now to FIG. 13, the LUN provider may return to the business logic provider a LUN object for LUN A including the properties for LUN A. FIG. 13 illustrates properties as may be included in a LUN object as described elsewhere herein in FIG. 6 with the additional property 1316, mirroring relationship, that may be a boolean value denoting whether LUN A is currently in an active mirroring relationship or not. The LUN object 1300 may also include yet another property 1318, is_active_migration_source, that may be a boolean value denoting whether LUN A is currently serving as source for a migration to a target and such migration is active or ongoing. Element 1316 may be used in connection with the first example and element 1318 is used in connection with other subsequent examples set forth below. The business logic may examine the value of 1316 for LUN A to determine whether LUN A has an active mirroring relationship. If so, the business logic provider may perform any one or more suitable actions, such as one of the above-mentioned three actions or any other suitable action as may be specified in an embodiment in accordance with techniques herein. If the LUN A does not currently have an active mirroring relationship, then the business logic provider may communicate with the snapshot provider to restore LUN A to its previous snapshot, SNAP LUN A. The business logic provider may communicate with the snapshot provider providing parameters including a Snap ID as described elsewhere herein identifying the particular snapshot to which LUN A is being restored since there may be multiple existing snapshots for LUN A at the time the restoration operation is performed.

In connection with this first example and also more generally with other examples herein, a policy may specify the restrictions for particular operations as used in data validation processing to determine whether or not to perform a requested operation. The policy may also indicate whether to take one or more particular responsive actions, such as a corrective action, and may also specify a resulting state with respect to any violated restrictions. For example, if a restriction with respect to a requested operation is violated, the policy may indicate that an error status should result and may specify that the responsive action is to block or not perform the requested operation. In this case, the business logic provider may return an error state to the client without performing the requested operation. The policy may also indicate, for example, that violation of another restriction with respect to a particular operation results in a warning status. For such a warning, the policy may further specify that a responsive action may include notifying the user, requesting input from the client as whether to proceed or not, and then proceeding with the operation if the user input has so indicated. As another example, for such a warning, the policy may indicate to notify the user regarding the detected warning status and condition and then take the responsive or corrective action automatically without requiring further user input.

Figure 14:
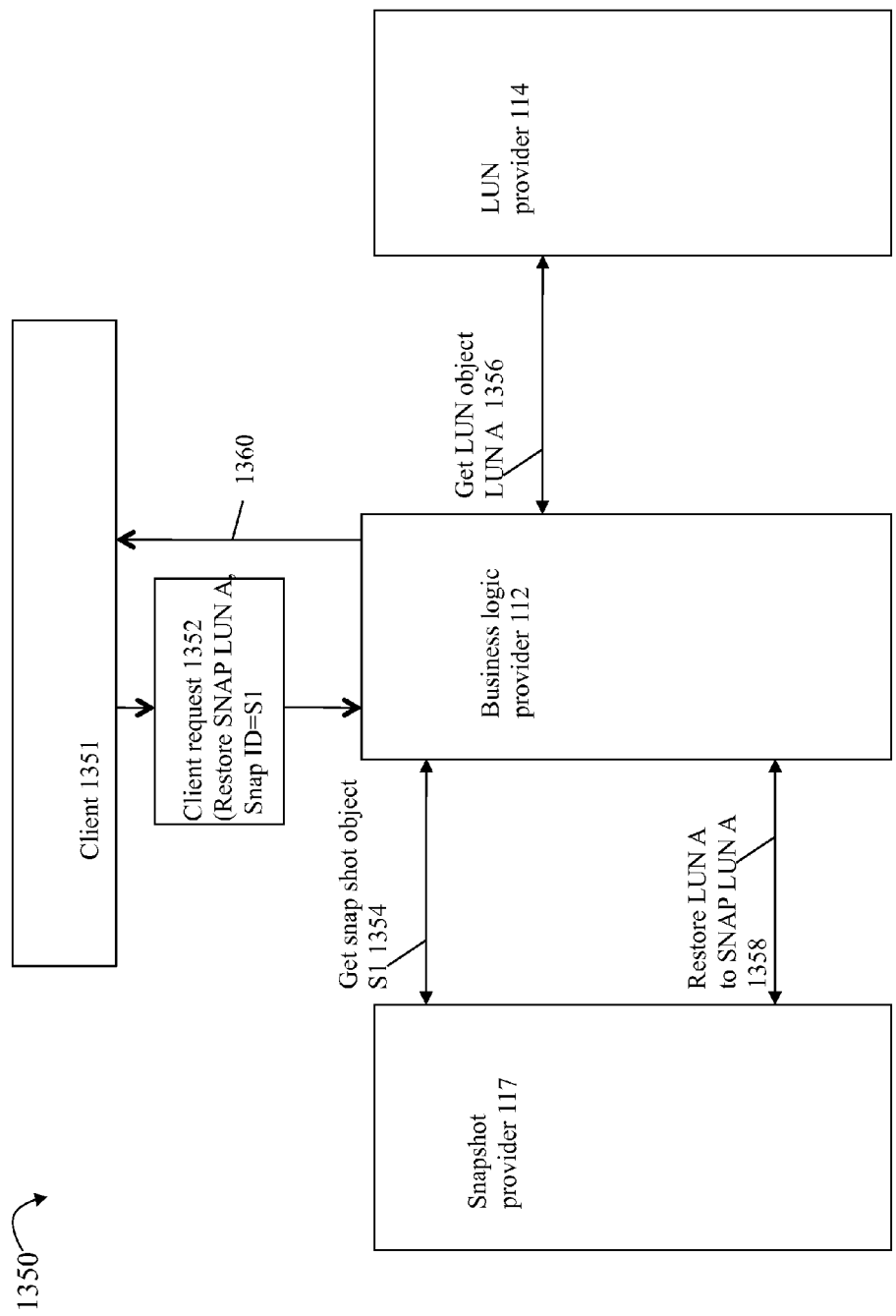
FIGS. 14, 16, 19 and 20 depict communications between the client and different providers in examples illustrating use of techniques herein.

Referring to FIG. 14, shown is an illustration of communications between the different providers in connection with the above-mentioned first example. In the example 1350, the client 1351 may issue a request 1352 to restore LUN A to its previous snapshot SNAP LUN A, identified by the snapshot identifier (Snap ID) S1. Prior to client request 1352 being issued, the system is in a state as described above where the snapshot SNAP LUN A has been created and LUN A is currently in an active mirroring relationship. The business logic provider 112 may receive the request 1352 and issue a request to the snapshot provider 117 for the snapshot object for SNAP LUN A as denoted by S1. Element 1354 denotes this request and response between providers 112 and 117 which result in returning the snapshot object for S1 to the business logic provider 112. The business logic provider retrieves the property LUN ID 516 from the snapshot object 510 for SNAP LUN A whereby LUN ID identifies the source LUN of the snapshot. As described herein, LUN ID included in the snapshot object may be based on a defined association or relationship between the snapshot object for SNAP LUN A and the LUN object for source LUN of SNAP LUN A. The LUN ID may be characterized as a foreign key or index into a table used by the LUN provider to obtain the LUN object/information of the source LUN of SNAP LUN A. The foreign key or index may be characterized as foreign or externally used by a provider other than the snapshot provider. As represented by 1356, the business logic provider 112 issues a request to LUN provider 114 using the LUN ID for LUN A to obtain the LUN object information for LUN A. With reference also to FIG. 13, the LUN object 1310 may include property 1316 which is then examined by the business logic provider in connection with validation processing performed to determine whether any restrictions are violated. If the property 1316 indicates an active mirroring relationship for LUN A, the business logic provider 112 may take an appropriate responsive action as denoted above and then return 1360 a response to the client 1351. If the property 1316 indicates an inactive mirroring relationship for LUN A, the business logic provider 112 may issue a request 1358 to the snapshot provider 117 to restore LUN A to its previous snapshot identified by SNAP LUN A's Snap ID S1. Element 1358 denotes the communication exchange between provider 112 and 117 to restore LUN A to its previous snapshot, SNAP LUNA. Subsequently, the business logic provider may return 1360 a response to the client 1351.

As a second example illustrating data validation processing to check whether there are any restriction violations, consider a case where there is a defined consistency group of LUNs for use in connection with performing snapshot operations. In some applications, it may be important that a set of LUNs are replicated, such as in connection with snapshots, as a content coherent set. In one embodiment, a consistency group (CG) may be defined as set of LUNs to enable such a set of content-related LUNS to be replicated as a single entity for maintaining data consistency and write order fidelity across all LUNs in the CG. Write order fidelity is the ability to preserve or keep data at the target or in the snapshot created in the same order as in the production site. When performing a snapshot operation with the above-mentioned CG feature, a single snapshot request may replicate all LUNs in the CG as one logical action (creating a snapshot of each LUN in the CG) ensuring that snapshot LUNs of the CG are guaranteed to be identical point in time, dependent write consistent restartable snapshots with respect to other LUNs in the same CG. In this second example, let LUN A be included in a defined existing CG when the client sends to the business logic provider a request to destroy LUN A. The destroy operation with respect to a LUN may be characterized as an operation that undefines, unconfigures, or disassociates the LUN from its underlying bound or provisioned storage and results in removing the destroyed LUN as an existing entity in the data storage system. A restriction may be specified whereby a LUN may not be destroyed if the LUN is a member of a CG. The snapshot provider may be the provider to utilize to obtain consistency group information. In this manner, the business logic provider may communicate with the snapshot provider to determine whether LUN A belongs to any defined CG. If so, the business logic provider may determine that the above-mentioned restriction has been violated and not allow the requested destroy operation to proceed. Alternatively, if the restriction has not been violated, the destroy operation may be performed by the business logic provider communicating with the LUN provider to destroy LUN A.

Figure 15:
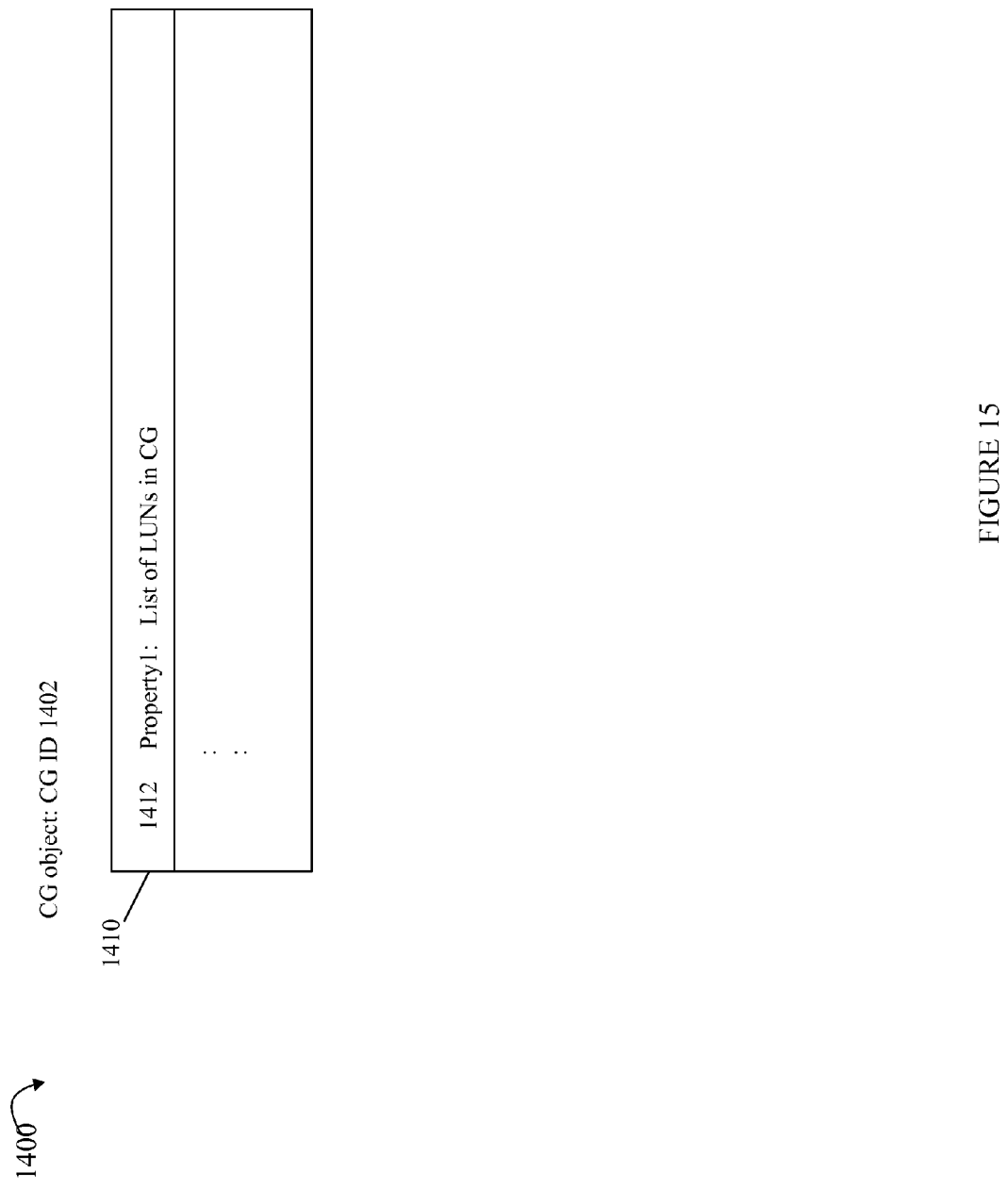

In connection with this second example, the business logic provider receives the client request to destroy LUN A. The client request may identify the LUN ID of the LUN A where the LUN ID may be the key or index into the LUN table of information as used by the LUN provider (e.g., a LUN ID such as described in connection with element 516 of the snapshot object used to identify in instance of object 1310 of FIG. 13). In one embodiment, such processing may include the business logic provider performing one or more calls to snapshot provider to obtain information on defined CGs to determine whether LUN A (as identified by it LUN ID) is identified as a member of any such defined CG's LUN LIST. With reference to FIG. 15, shown is an example of a CG object as may be constructed and returned by the snapshot provider for a single defined CG. The CG object may be constructed by the snapshot provider using information from the database 106 of FIG. 3 such as described herein for constructing the snapshot object and others. The snapshot object 1410 may include property 1 1412 which is a list of LUNs included in the CG instance. A CG may be uniquely identified by a CG ID (identifier)) 1402. In connection with this example, the business logic provider may not have a CG ID but may rather issue one or more requests to the snapshot provider to iterate or traverse through all defined CGs and obtain defined CG objects until either one of the CGs identifies LUN A as a member, or until there are no further CGs to examine (e.g., the business logic provider has performed an exhaustive search of all defined CGs). The property 1412 may include a list of LUN IDs where each LUN ID on the list denotes a different LUN in the CG. Each of the LUN IDs in 1412 may be a key or identifier into a table of LUN information/objects as used by the LUN provider (e.g. used to identify an instance of 1302 as in FIG. 13).

Figure 16:
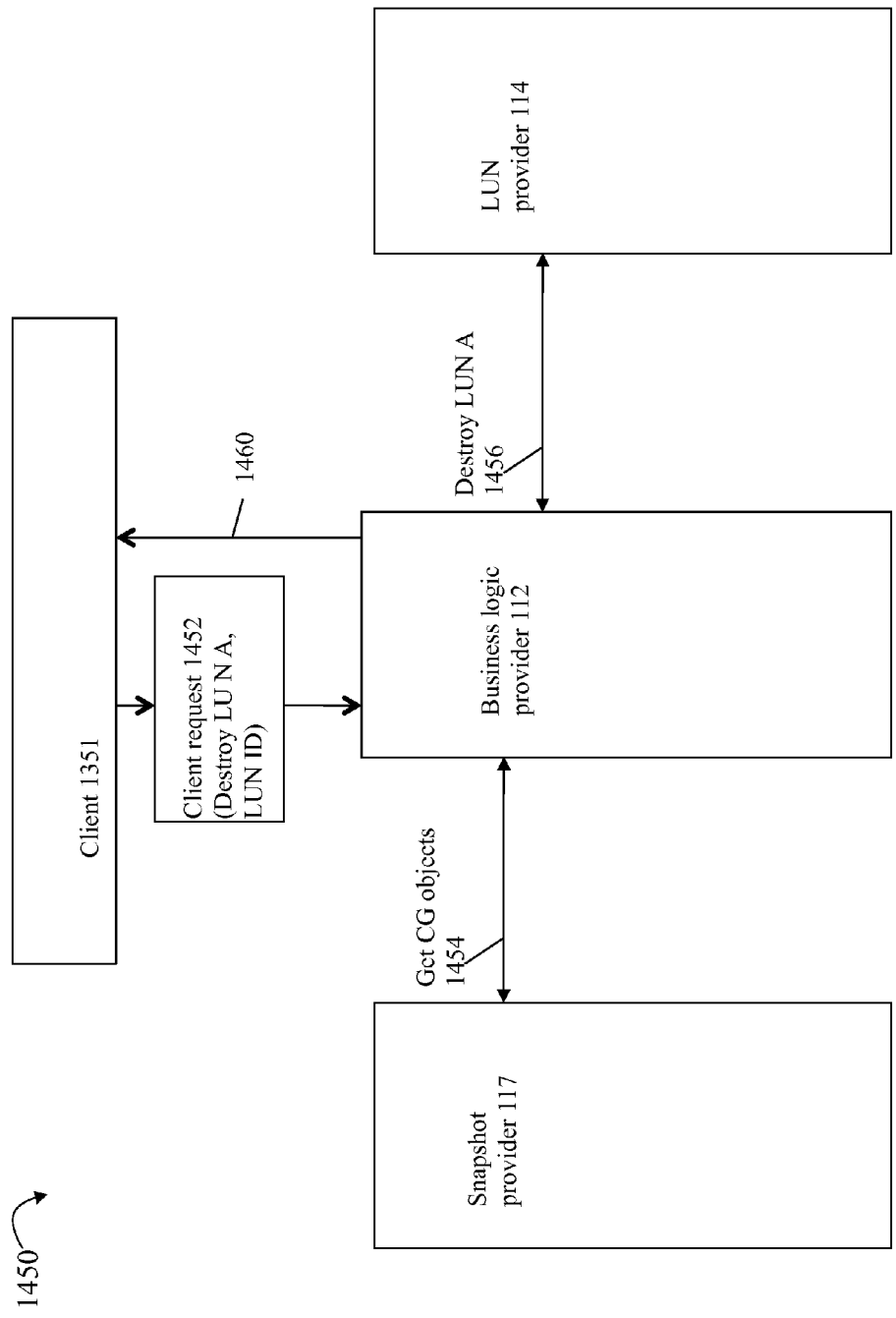

Referring to FIG. 16, shown is an illustration of communications between the different providers in connection with the above-mentioned second example. In the example 1450, the client 1351 may issue a request 1452 to destroy LUN A. Prior to client request 1452 being issued, the system is in a state as described above where the CG is defined to include LUN A and one or more other LUNs. The business logic provider 112 may receive the request 1452 and issue one or more requests to the snapshot provider 117 for one or more CG objects. Element 1454 denotes the communications between 112 and 117 to return the one or more CG objects to the business logic provider 112. The business logic provider retrieves the property 1412 from the CG object 1402 whereby 1412 is a list of LUNs in the CG (e.g., list of LUN IDs of the LUNs in the CG). As described herein, each LUN ID included in 1412 may be based on a defined association or relationship between the CG object and the LUN object denoting that the LUN ID represents a LUN included in the CG. The LUN ID may be characterized as a foreign key or index into a table used by the LUN provider to obtain the LUN object/information. The client request may also specify a LUN ID for LUN A. As part of validation processing, the business logic provider may traverse the list of LUN IDs in 1412 to determine whether any LUN ID on the list matches the LUN ID for LUN A as provided in the client destroy request. If LUN A's LUN ID is found in any list of 1412 thereby indicating that the LUN is a member of a CG, the business logic provider 112 may take an appropriate responsive action as denoted above and then return 1460 a response to the client 1351. If LUN A's LUN ID is not found in any list of 1412 thereby indicating that the LUN is not a member of a CG, the business logic provider 112 may issue a request 1456 to the LUN provider 114 to destroy LUN A. Subsequently, the business logic provider may return 1360 a response to the client 1351.

As described herein, the multiple LUN IDs included in the CG object (e.g., property 1412) may be based on a defined association or relationship between the CG and the LUN objects for those LUNs included in the CG.

Figure 17:
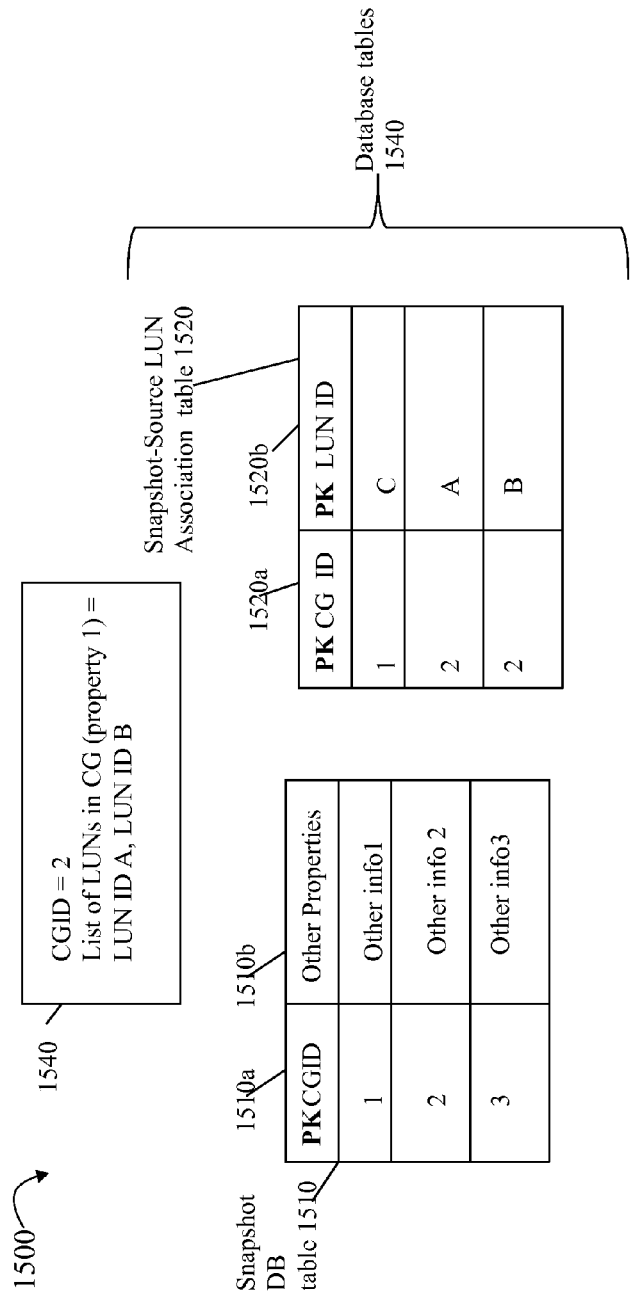
FIG. 17 is an example illustrating an object and data tables that may be used in an embodiment in accordance with techniques herein.

Referring to FIG. 17, shown is an example of data tables that may be used in an embodiment in accordance with techniques herein. The tables 1510, 1520 may be database tables 1540 included in the database 106 of FIG. 3. Table 1510 may include CG property information (e.g. such as additional property information besides that as included in element 1412 of FIG. 15) and table 1520 includes CG object property information for property 1 (e.g., for 1412 of FIG. 15 for the association or relationship to the LUNs in this CG). The tables 1510, 1520 may be queried by the snapshot provider in connection with generating a CG object on demand. In this example 1500 for simplicity, it is noted that the CG object 1540 is illustrated as only including the list of LUNs for the CG and no additional properties. Additionally, following is example of an SQL query that may be used in connection with determining the list of LUNs for the CG 1412. However, in the following exemplary SQL statement, it should be noted that each LUN may be returned as a separate row of information rather than in the form of a combined list as represented by property 1 1412. The following SQL query including INNER JOIN statements may be used to combine properties from tables 1510 and 1520 to construct a CG object 1540.

The table 1520 is a table of associations between a CG and a LUN object where table 1520. Each row of table 1510 may be joined with a row of table 1520 to obtain the aggregate set or list of LUNs for the desired CG. Each association object included in table 1520 may include only two primary keys associated with two other objects denoting the association or relationship between such object instances. Element 1520a may denote a particular CG having a CG ID which is a primary key (PK) into table 1510. Element 1520b may denote a particular LUN having the LUN ID which may be used as a PK into a LUN table (as used by the LUN provider and described elsewhere herein). Additionally, the LUN ID of the LUN to be destroyed also denoted an occurrence of a PK into the LUN table (not illustrated in this example). Thus, validation processing of the business logic provider as described above for the destroy operation for destroying a specified LUN ID may include examining the list of LUNs returned from this query for a CG (e.g., to determine whether the LUN ID of the destroy operation matches any LUN on the list for the CG returned by SQL query).

In a manner similar to as described herein for the snapshot object, the CG object may be created by extracting necessary data from tables, such as tables of the database 106. Such extraction may be performed using SQL queries or other suitable commands. As an example with reference to FIG. 7, INNER JOIN clauses of database queries may be used to extract the necessary data from such tables in generating a single requested snapshot object.

The following is an example of a description representing logic that may be performed using any suitable commands, such as SQL query statement(s), to construct a view for a CG object (denoted as CG2) having a CG ID of 2 as represented by element 1540 of FIG. 17. For example, in connection with traversing through the list of defined CGs as discussed above, the second defined CG may have an object identified as having CG ID=2. For shorthand purposes, table 1510 is denoted as T1 and table 1520 is denoted as T2 in the following SQL statement:
1 CREATE VIEW "CG2" AS SELECT
2 T1.CGID AS CGID
3 FROM T1 INNER JOIN T2
4 ON T1.CGID=T2.CGID AND T1.GID="2"

In element 1540, the CG object has a primary key of CGID=2 with the returned list of LUNs from the above-referenced query included as the list of LUNs in the CG (property 1).

As a third example, consider a case LUN A, which has an existing first snapshot, SNAP LUN A, as described above in connection with the first example. Additionally, assume that LUN A is also the source device of an active ongoing migration operation to migrate data of LUN A to another device. Now, assume the client issues a request to restore LUN A to its previous snapshot, SNAP LUN A. The restore operation may be restricted if LUN A is the source of an active migration. In other words, the business logic provider may perform processing prior to performing the request to restore LUN A to its previous snapshot SNAP LUN A to determine whether LUN A is the source of an active migration. If it is determined that this restriction is violated thereby indicating that LUN A is the source of an active migration at the time the restoration request is made, then the business logic provider may take any suitable action. For example, the business logic provider may return an error message to the client and fail to perform the restoration operation.

In connection with the client request to restore LUN A to its snapshot SNAP LUN A, the snapshot provider includes information about the snapshot SNAP LUN A but may not have any information regarding whether LUN A is the source device of an active migration. With reference to FIG. 5, the request from the client may specify the Snap ID of the snapshot for SNAP LUN A to be used for the restoration. The business logic provider may communicate with the snapshot provider to obtain an instance of the snapshot object for SNAP LUN A and use the third property, LUN ID 516 of the snapshot object in connection with identifying the LUN ID which is used by the LUN provider to obtain LUN information from a LUN table. In this manner, the business logic provider may receive the client request and communicate with the LUN provider using the LUN ID for LUN A to obtain information about whether LUN A is currently specified as the source of an active migration. Consistent with description elsewhere herein and referring now to FIG. 13, the LUN provider may return to the business logic provider a LUN object for LUN A including the properties for LUN A. FIG. 13 illustrates properties as may be included in a LUN object and utilize property 1318. The business logic may examine the value of 1318 for LUN A to determine whether LUN A is the source of an active migration. If so, the business logic provider may perform any one or more suitable actions, such as determine not to perform the requested restoration operation due to the restriction violation and then return an error to the client indicating this failure to perform the requested operation. If the LUN A is currently not the source of an active migration, then the business logic provider may communicate with the snapshot provider to restore LUN A to its previous snapshot, SNAP LUN A. The business logic provider may communicate with the snapshot provider providing parameters including a Snap ID as described elsewhere herein identifying the particular snapshot to which LUN A is being restored since there may be multiple existing snapshots for LUN A as the time the restoration operation is performed.

It should be noted that the communications between the providers as illustrated in connection with FIG. 14 for the above-mentioned first example are the same in connection with the above-referenced third example with the difference that the business logic provider uses attribute 1318 from the LUN object 1356 and performs validation processing using this value to determine whether a different restriction is violated (whether LUN A is a source of an active migration). Also, in connection with this third example, the processing performed may utilize a defined association or relationship between the LUN ID denoting a LUN object of the LUN provider and a SNAP ID of a snapshot object. As described herein, LUN ID included in the snapshot object may be based on a defined association or relationship between the snapshot object for SNAP LUN A and the LUN object for snapshot's source LUN A.

Figure 18:
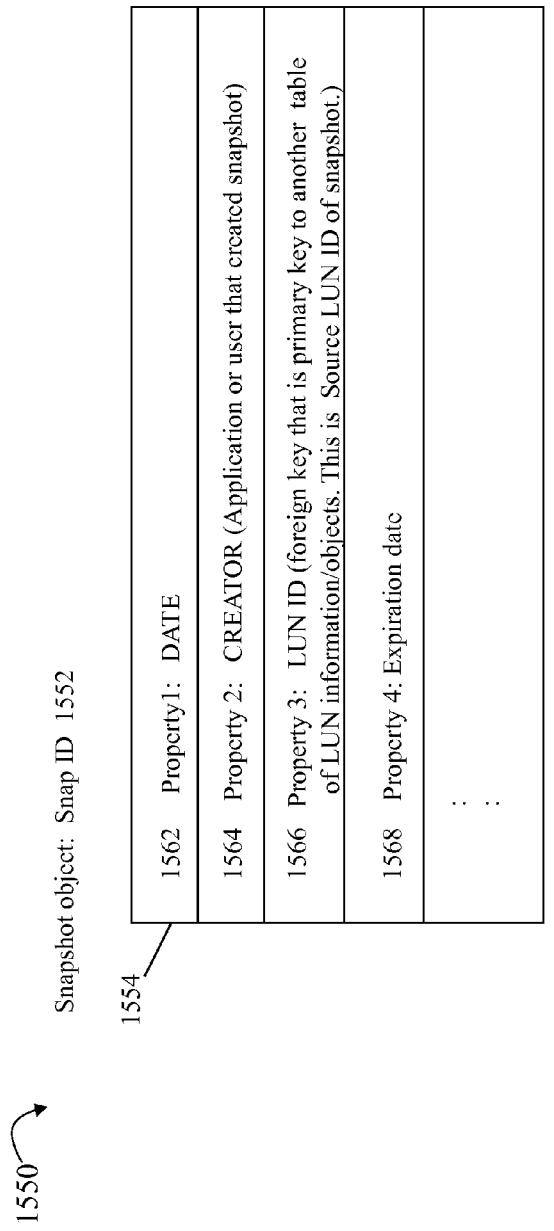

As a fourth example, consider a case where LUN A is defined and a snapshot of LUN A, SNAP LUN A, exists. In this example, the SNAP LUN A has been created with an expiration date/time. The expiration date may be an attribute of a snapshot object. With reference to FIG. 18, shown is an example of a snapshot object as may be used in connection with this fourth example. The snapshot object 1554 includes the attributes as described elsewhere herein (e.g., in connection with FIG. 5) with the additional property 4 1568 denoting the snapshot's expiration date. The expiration date may be used to denote a point at which the data of this snapshot is considered stale or out of date and should not be used. In connection with other applications and uses, the expiration date 1568 may also be used in connection with data life cycle management processing which may automatically provide for performing some action with the snapshot data after the expiration date. For example, after the expiration date, the snapshot may be deleted, may be consolidated with one or more other data sets and moved to a different storage device, such as tape devices, backup archived data, and the like. At this point, the business logic provider may receive a client request to restore LUN A to its previous snapshot SNAP LUN A. In connection with this example, an embodiment may specify a restriction which indicates that a restoration should not be performed using a snapshot if the snapshot has expired (e.g., current date on which the restoration is requested is at or beyond the expiration date of the snapshot SNAP LUN A). The restore request received from the client may be as described above and include a SNAP ID for the snapshot to be restored to its source LUN. The business logic provider may use this SNAP ID and request the snapshot object 1552 for LUN A from the snapshot provider. The business logic provider may retrieve the property 1568 for SNAP LUN A's expiration date and compare this date to the current date. If the current date is greater than its the expiration date, a restriction violation may be determined and the business logic provider may take a suitable action. For example, violating this restriction may be deemed a warning rather than an error. In this case, one suitable action is for the business logic provider to notify the client regarding this warning for the expired snapshot, and request whether the client still wants to proceed despite the snapshot being expired. If the client indicates to proceed with the restoration, the business logic provider may communicate with the snapshot provider to perform the requested restoration. Otherwise, if the client indicates not to proceed with the restoration, the business logic provider does not perform the restoration. If the snapshot has not expired, the business logic provider may determine that there is no restriction violation and proceed with requesting the restoration by communicating the request to the snapshot provider.

Figure 19:
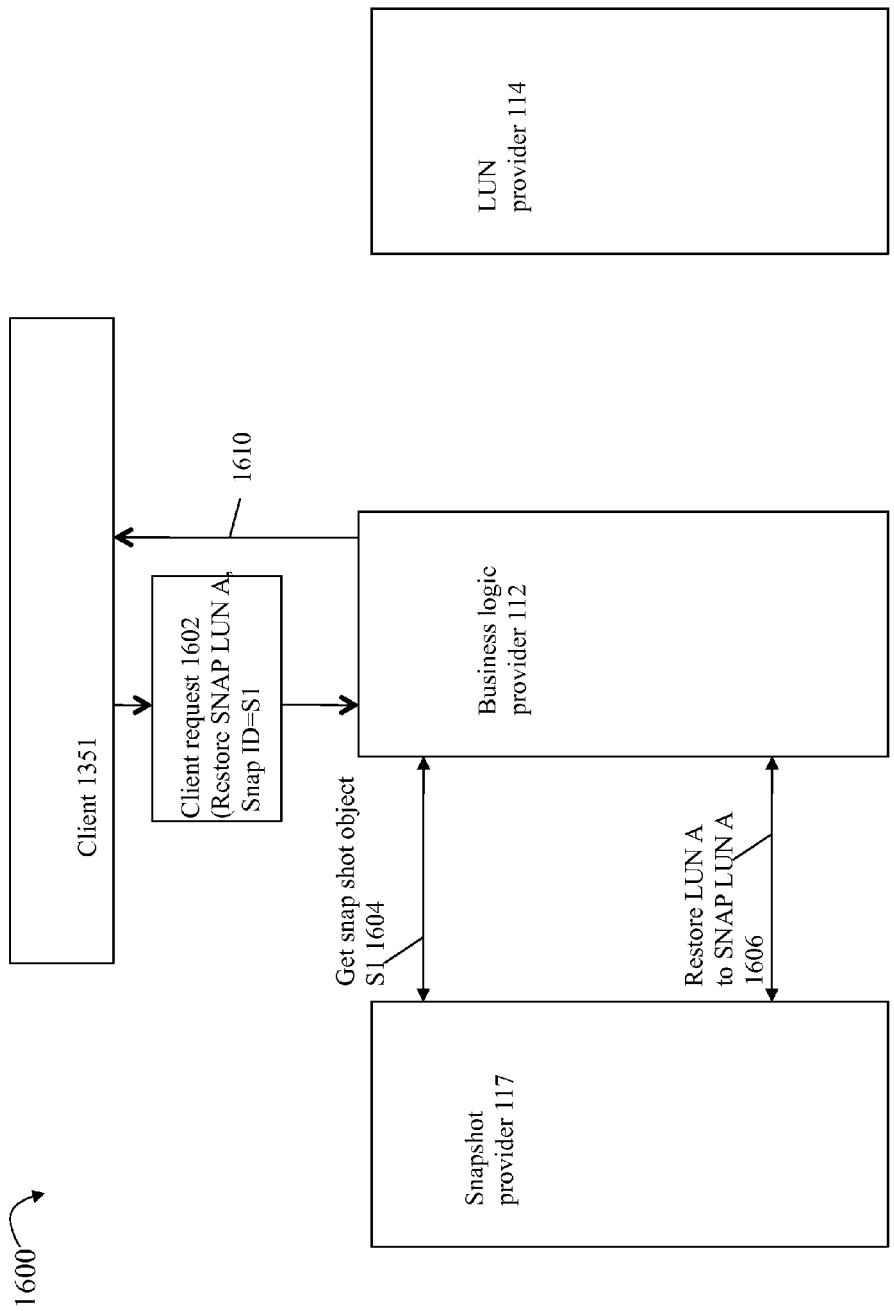

Referring to FIG. 19, shown is an illustration of communications between the different providers in connection with the above-mentioned fourth example. In the example 1600, the client 1351 may issue a request 1602 to restore LUN A to its previous snapshot SNAP LUN A, identified by the snapshot identifier (Snap ID) S1. Prior to client request 1602 being issued, the system is in a state as described above where the snapshot SNAP LUN A has been created. The business logic provider 112 may receive the request 1602 and issue a request to the snapshot provider 117 for the snapshot object for SNAP LUN A as denoted by S1. Element 1604 denotes this request and response between providers 112 and 117 which result in returning the snapshot object for S1 to the business logic provider 112. With reference also to FIG. 18, the business logic provider retrieves the property expiration date 1568 from the snapshot object 1550 for SNAP LUN A. Property 1568 is examined by the business logic provider in connection with validation processing performed to determine whether any restrictions are violated. If the property 1568 indicates that SNAP LUN A has expired, the business logic provider 112 may take an appropriate responsive action as denoted above and then return 1610 a response to the client 1351. If the property 1568 indicates that SNAP LUN A has not expired, the business logic provider 112 may issue a request 1606 to the snapshot provider 117 to restore LUN A to its previous snapshot identified by SNAP LUN A's Snap ID S1. Element 1606 denotes the communication exchange between provider 112 and 117 to restore LUN A to its previous snapshot, SNAP LUNA. Subsequently, the business logic provider may return 1610 a response to the client 1351.

In connection with a fifth example, consider a case where LUN A is defined as is currently the source of an active migration as described above. In connection with such a migration, it should be noted that after the migration has completed, the target of the migration may assume the identity of the source. For example, if LUN A is in a first data storage system and is the migration source being migrated to a target LUN B in a second different data storage system, once the migration has completed, LUN B will assume LUN A's identity in connection with the data storage system. Such transfer of identity may include reassigning LUN B to have LUN A's WWN (world wide name) or other identifier by which clients of the data storage system uniquely identify LUNs in the data storage systems. At this point while the migration is active and ongoing to migrate LUN A to another target LUN, the business logic provider may receive a request to create a snapshot of LUN A. The client request may include a LUN ID for LUN A (e.g. value identifying an instance of a LUN object 1302 corresponding to LUN A). A restriction may be specified that a snapshot should not be created for a LUN, LUN A, if LUN A is currently the source of an active migration. One rationale for this may be due to the fact that the data for LUN A will be relocated to a different physical location and possibly different data storage system after the migration has completed. If the snapshot(s) for LUN A are not automatically relocated to the second target data storage system along with the migrated LUN A, the snapshot existing for LUN A in the first source data storage system may be automatically deleted. In this manner, the client may be requesting to create a snapshot that may imminently be automatically deleted by the data storage system. In another embodiment, the snapshots for LUN A may be automatically moved to the second target data storage system once the migration has completed. However, there may be a defined policy to by default not just let the user create the snapshot without being notified of such migration of LUN A and its snapshot(s).

Responsive to receiving the client request, the business logic provider may communicate with the LUN provider to obtain the LUN object for LUN A and examine the property 1318 (e.g. as denoted in FIG. 13) to determine whether LUN A is currently the source of an active migration. If so, the business logic provider may determine there has been a restriction violation and perform a suitable action. Otherwise, if there has been no restriction violation, the business logic provider may proceed with the request to create a snapshot for LUN A by communicating this request to the snapshot provider. If there has been a restriction violation in that LUN A is currently the source of an active migration and a snapshot of LUN A should not now be created, one possible option for a suitable action may be to not perform the operation and return an error to the client. As another possible action responsive to the restriction violation, the restriction may result in a warning being issued to the client regarding the current status of the ongoing migration and any subsequent defaults performed by the system as part of this migration. For example, the system may notify the user of the fact that the snapshot will be automatically deleted after the migration has completed and inquire whether the user wants to continue anyway. As another example, the system may notify the user of the fact that the snapshot will be automatically migrated with LUN A to the target data storage system after the migration has completed and inquire whether the user wants to continue anyway. Whether the snapshot creation operation proceeds from this point may depend on the response supplied by the client.

Figure 20:
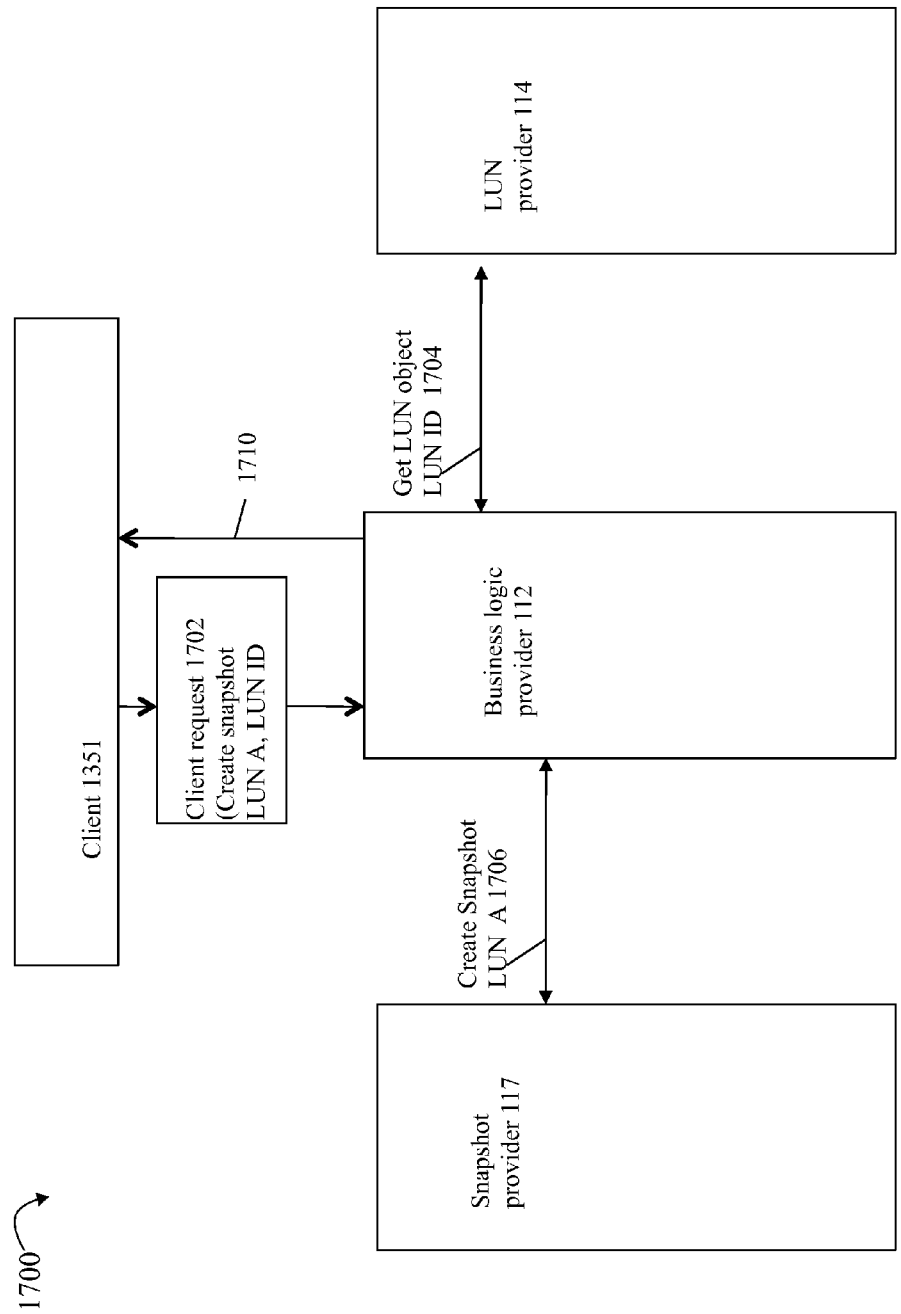

Referring to FIG. 20, shown is an illustration of communications between the different providers in connection with the above-mentioned fifth example. In the example 1700, the client 1351 may issue a request 1702 to create a snapshot of LUN A identified by its LUN ID included in the request. Prior to client request 1702 being received by the business logic provider 112, the system is in a state as described above where LUN A has been defined or configured. The business logic provider 112 may receive the request 1702 and issue a request to the LUN provider 114 for the LUN object for LUN A. Element 1704 denotes this request and response between providers 112 and 114 which result in returning the LUN object for LUN A to the business logic provider 112. With reference also to FIG. 13, the business logic provider retrieves the property 4 1318 from the LUN object 1300 for LUN A. Property 1318 is examined by the business logic provider in connection with validation processing performed to determine whether any restrictions are violated. If the property 1318 indicates that LUN A is the source of an active migration, the business logic provider 112 may take an appropriate responsive action as denoted above and then return 1710 a response to the client 1351. If the property 1318 indicates that LUN A is currently not the source device of an active migration, the business logic provider 112 may issue a request 1706 to the snapshot provider 117 to create the snapshot for LUN. Element 1706 denotes the communication exchange between provider 112 and 117 to create this snapshot for LUN A. Subsequently, the business logic provider may return 1710 a response to the client 1351.

The foregoing are just some examples of restrictions and data validation processing that may be performed by the business logic provider in an embodiment in accordance with techniques herein.

Figure 21:
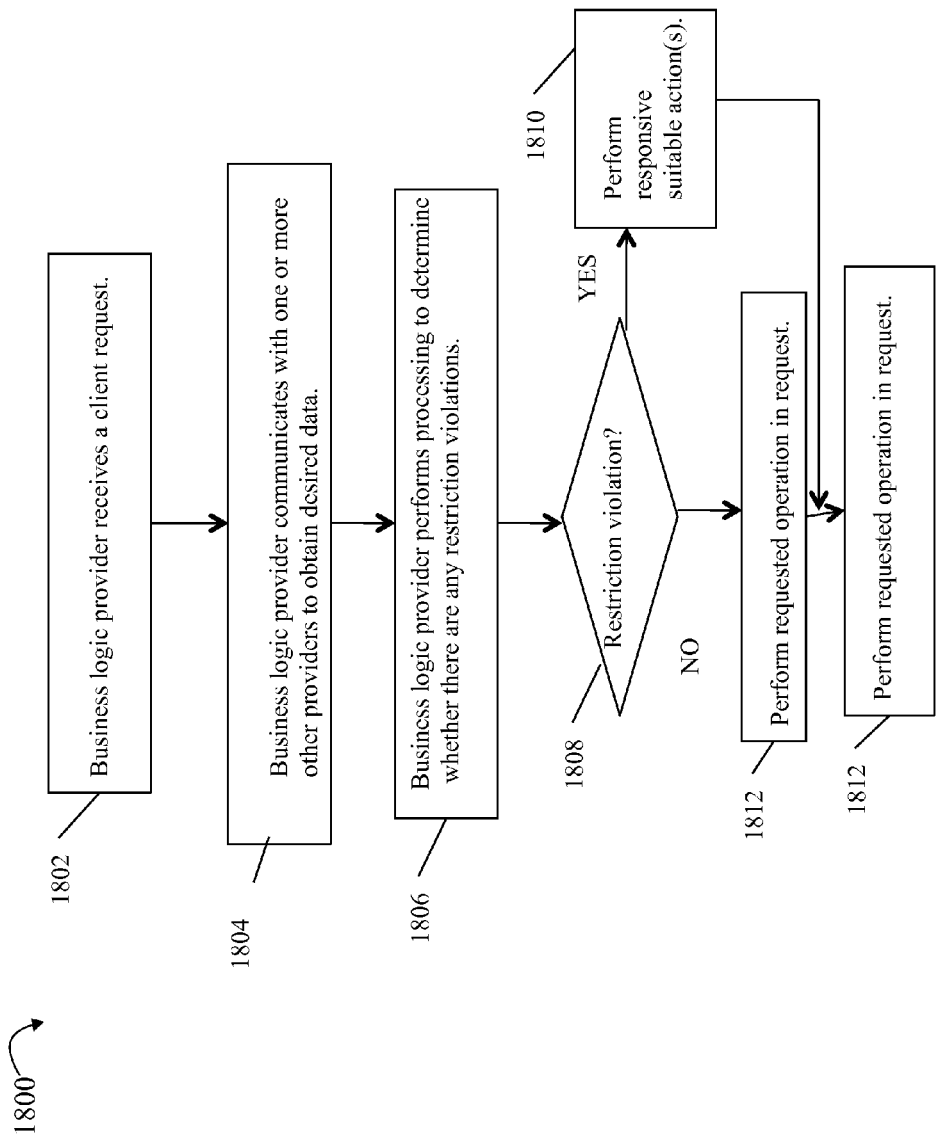

Referring to FIG. 21, shown is a flowchart of processing steps as may be performed in an embodiment in accordance with techniques herein. The flowchart 1800 provides a high level summary of processing steps as described in connection with the above-referenced examples for data validation processing as may be performed by the business logic provider. At step 1802, the business logic provider may receive a client request to perform an operation. At step 1804, the business logic provider may communicate with one or more other providers to obtain desired data whereby such data may be used in connection with performing data validation processing At step 1806, the business logic provider performs processing to determine whether any specified restrictions have been violated. If step 1808, a determination is made as to whether a restriction has been violated. If so, control proceeds to step 1810 to perform a suitable responsive action for the restriction violation and then return a response to the client in step 1814. The responsive actions may also include performing the requested operation depending on the restriction violated, the particular operation, and responsive action(s) performed in embodiment. If step 1808 evaluates to no, control proceeds to step 1812 to perform the requested operation in the request and then return a response to the client in step 1814.

An embodiment may implement the techniques herein using code executed by a processor. For example, an embodiment may implement the techniques herein using code which is executed by a processor of the data storage system. As will be appreciated by those skilled in the art, the code may be stored on the data storage system on a computer-readable storage medium having any one of a variety of different forms including volatile and nonvolatile, removable and non-removable media implemented in any method or technology for storage of information such as computer readable instructions, data structures, program modules or other data. Computer-readable storage media includes, but is not limited to, RAM, ROM, EEPROM, flash memory or other memory technology, CD-ROM, (DVD) or other optical storage, magnetic cassettes, magnetic tape, magnetic disk storage or other magnetic storage devices, or any other medium which can be used to store the desired information and which can accessed by a processor.

While the invention has been disclosed in connection with preferred embodiments shown and described in detail, their modifications and improvements thereon will become readily apparent to those skilled in the art. Accordingly, the spirit and scope of the present invention should be limited only by the following claims.

What is claimed is:

1. A method for processing a request comprising:
receiving a request from a client, wherein a first storage device has a first snapshot taken at a first point in time, wherein said request is received subsequent to the first point in time and requests restoration of the first storage device to its first snapshot;
responsive to receiving the request, performing first processing to process the request to restore the first storage device to its first snapshot, the first processing including:
communicating with one or more providers for information in connection with the request;
performing validation processing using the information obtained from the one or more providers to determine whether one or more restrictions are violated, each of said one or more restrictions identifying a required state of one or more objects for performing the request;
determining whether any of said one or more restrictions are violated;
performing processing to restore the first storage device to its first snapshot responsive to determining that none of the one or more restrictions are violated; and
performing one or more actions responsive to determining that any of said one or more restrictions are violated, and wherein a first of said restrictions specifies that a first storage device is not restored to one of its snapshots if said first storage device has a mirroring relationship that is active with a primary copy of data of the storage device that is mirrored in a second copy whereby synchronization processing is performed to keep said second copy synchronized with said primary copy, and wherein said validation processing includes:
  determining whether the mirroring relationship for the first device is active; and
  if it is determined that the mirroring relationship for the first device is active, determining that there has been a restriction violation and not to restore the first storage device to its first snapshot.

2. The method of claim 1, wherein the request is received by a business logical provider and each of the one or more other providers is a provider other than the business logical provider.

3. The method of claim 2, wherein the business logic provider communicates with any of a snapshot provider providing services in connection with the first snapshot of the first storage device and a storage device provider providing services in connection with the first storage device having the first snapshot.

4. The method of claim 3, wherein said first processing further comprises:
  communicating with said storage device provider to obtain a first set of one or more properties for said first storage device, a first property in said first set indicating whether said first storage device has said mirroring relationship that is active or inactive.

5. The method of claim 4, wherein said validation processing includes:
  determining whether said first property indicates whether said mirroring relationship for said first storage device is active, wherein when said mirroring relationship is inactive, synchronization processing is not performed to keep said second copy synchronized with said primary copy.

6. The method of claim 5, wherein if it is determined that said mirroring relationship for the first storage device is inactive, communicating with said snapshot provider to restore the first storage device to the first snapshot.

7. The method of claim 3, wherein said first storage device is a source of an active migration operation to migrate the first storage device to a second storage device.

8. The method of claim 7, wherein said business logic provider communicates with said storage device provider in connection with determining whether said first storage device is a source of an active migration operation, and a second of said restrictions specifies that a restoration operation cannot be performed to restore a storage device that is a source of an active migration.

9. The method of claim 8, wherein if it is determined that said first storage device is a source of an active migration, determining not to perform the request to restore the first storage device to the first snapshot, and if it is determined that said first storage device is not a source of an active migration, performing processing including communicating with said snapshot provider to restore the first storage device to the first snapshot of the first storage device.

10. The method of claim 3, wherein said first snapshot has a first expiration date indicating when the first snapshot is deemed expired.

11. The method of claim 10, wherein the business logic provider communicates with the snapshot provider to determine whether the first snapshot has expired, and the method includes:
  determining whether the first snapshot has expired;
  if it is determined that the first snapshot has expired, performing second processing including:
    issuing a warning to the client regarding expiration of the first snapshot;
    obtaining a response as to whether to proceed with the request to restore the first storage device to the first snapshot; and
    communicating with said snapshot provider to restore the first storage device to the first snapshot if said response indicates to proceed with the request; and
  if it is determined that the first snapshot has not expired, communicating with said snapshot provider to restore the first storage device to the first snapshot.

12. The method of claim 3, wherein said first storage device is a source device of an active migration operation to migrate the first storage device to a second storage device, another request is received at the business logical provider and the another request is a request to create a snapshot of the first storage device, and the business logic provider communicates with the storage device provider to determine whether the first storage device is currently the source of an active migration.

13. The method of claim 12, wherein a restriction specifies that a snapshot should not be created for a storage device that is a source of an active migration, and wherein the method includes:
  determining whether the first storage device is a source device of an active migration; and
  if it is determined that the first storage device is not a source device of an active migration, communicating with said snapshot provider to create a snapshot of the first storage device in accordance with the another request.

14. A non-transitory computer readable medium comprising code stored thereon, that, when executed, performs a method for processing a request comprising:
  receiving a request from a client, wherein a first storage device has a first snapshot taken at a first point in time, wherein said request is received subsequent to the first point in time and requests restoration of the first storage device to its first snapshot;
  responsive to receiving the request, performing first processing to process the request to restore the first storage device to its first snapshot, the first processing including:
    communicating with one or more providers for information in connection with the request;
    performing validation processing using the information obtained from the one or more providers to determine whether one or more restrictions are violated, each of said one or more restrictions identifying a required state of one or more objects for performing the request;
    determining whether any of said one or more restrictions are violated;
    performing processing to restore the first storage device to its first snapshot responsive to determining that none of the one or more restrictions are violated; and
    performing one or more actions responsive to determining that any of said one or more restrictions are violated, and wherein a first of said restrictions specifies that a first storage device is not restored to one of its snapshots if said first storage device has a mirroring relationship that is active with a primary copy of data of the storage device that is mirrored in a second copy whereby synchronization processing is performed to keep said second copy synchronized with said primary copy, and wherein said validation processing includes:

determining whether the mirroring relationship for the first device is active; and if it is determined that the mirroring relationship for the first device is active, determining that there has been a restriction violation and not to restore the first storage device to its first snapshot.

15. The non-transitory computer readable medium of claim 14, wherein the request is received by a business logical provider and each of the one or more other providers is a provider other than the business logical provider.

16. The non-transitory computer readable medium of claim 15, wherein the business logic provider communicates with any of a snapshot provider providing services in connection with the first snapshot of the first storage device and a storage device provider providing services in connection with the first storage device having the first snapshot.

17. A system comprising:

a processor; and a memory comprising code stored therein that, when executed, performs a method of processing a request comprising:

receiving a request from a client, wherein a first storage device has a first snapshot taken at a first point in time, wherein said request is received subsequent to the first point in time and requests restoration of the first storage device to its first snapshot;

responsive to receiving the request, performing first processing to process the request to restore the first storage device to its first snapshot, the first processing including:

communicating with one or more providers for information in connection with the request;

performing validation processing using the information obtained from the one or more providers to determine whether one or more restrictions are violated, each of said one or more restrictions identifying a required state of one or more objects for performing the request;

determining whether any of said one or more restrictions are violated;

performing processing to restore the first storage device to its first snapshot responsive to determining that none of the one or more restrictions are violated; and performing one or more actions responsive to determining that any of said one or more restrictions are violated, and wherein a first of said restrictions specifies that a first storage device is not restored to one of its snapshots if said first storage device has a mirroring relationship that is active with a primary copy of data of the storage device that is mirrored in a second copy whereby synchronization processing is performed to keep said second copy synchronized with said primary copy, and wherein said validation processing includes:

determining whether the mirroring relationship for the first device is active; and if it is determined that the mirroring relationship for the first device is active, determining that there has been a restriction violation and not to restore the first storage device to its first snapshot.

18. The system of claim 17, wherein the request is received by a business logical provider and each of the one or more other providers is a provider other than the business logical provider.

19. The system of claim 18, wherein the business logic provider communicates with any of a snapshot provider providing services in connection with the first snapshot of the first storage device and a storage device provider providing services in connection with the first storage device having the first snapshot.

* * * * *